United States Patent
Humphreys

(10) Patent No.: US 12,516,525 B2
(45) Date of Patent: Jan. 6, 2026

(54) METHOD AND APPARATUS FOR INSTALLING ROOFING SHINGLES

(71) Applicant: John Humphreys, Denver, CO (US)

(72) Inventor: John Humphreys, Denver, CO (US)

( * ) Notice: Subject to any disclaimer, the term of this patent is extended or adjusted under 35 U.S.C. 154(b) by 201 days.

(21) Appl. No.: 17/640,891

(22) PCT Filed: Sep. 15, 2020

(86) PCT No.: PCT/US2020/050894
§ 371 (c)(1),
(2) Date: Mar. 7, 2022

(87) PCT Pub. No.: WO2021/055362
PCT Pub. Date: Mar. 25, 2021

(65) Prior Publication Data
US 2022/0307262 A1    Sep. 29, 2022

Related U.S. Application Data

(60) Provisional application No. 62/900,690, filed on Sep. 16, 2019.

(51) Int. Cl.
*E04D 1/34* (2006.01)
*E04D 1/20* (2006.01)

(52) U.S. Cl.
CPC .............. *E04D 1/34* (2013.01); *E04D 1/20* (2013.01); *E04D 2001/3438* (2013.01);
(Continued)

(58) Field of Classification Search
CPC ...... E04D 1/34; E04D 1/20; E04D 2001/3438; E04D 2001/345; E04D 2001/3455;
(Continued)

(56) References Cited

U.S. PATENT DOCUMENTS 1,876,597 A    9/1932  Bennett
2,488,887 A    11/1949 Adams
(Continued)

FOREIGN PATENT DOCUMENTS

DE           3713320       11/1988
DE      10 2013 010 640    12/2014
(Continued)

*Primary Examiner* — Omar F Hijaz
(74) *Attorney, Agent, or Firm* — Perry Saidman, LLC

(57) ABSTRACT

A method and apparatus for installing roofing shingles on a roof deck in a top-to-bottom manner is disclosed. Engineered battens am positioned and installed on the roof deck in a bottom-to-top manner. Each batten has a female mating area which allows complementary shingles to be securely attached to the battens by sliding a corresponding mating portion of a shingle into the mating area of the batten resulting in a snap-fit engagement which secures the shingles onto the roof deck without nails. The method and apparatus have several unique advantages, such as allowing shingles to expand and contract ("breathe") without buckling and/or tearing when the ambient temperature fluctuates. In addition, since the manner of installation is from top-to-bottom, this allows roofers to use the rows of nailed battens as safety scaffolding improving roofers' traction and ultimately enhancing their safety while performing this inherently dangerous job.

26 Claims, 29 Drawing Sheets

(52) U.S. Cl.
CPC ............ *E04D 2001/345* (2013.01); *E04D 2001/3455* (2013.01); *E04D 2001/3458* (2013.01); *E04D 2001/3473* (2013.01); *E04D 2001/3491* (2013.01); *E04D 2001/3494* (2013.01)

(58) Field of Classification Search
CPC .... E04D 2001/3458; E04D 2001/3473; E04D 2001/3491; E04D 2001/3494; E04D 2001/3447; E04D 12/004
See application file for complete search history.

(56) References Cited

U.S. PATENT DOCUMENTS

| | | | |
|---|---|---|---|
| 2,632,538 A | | 3/1953 | Schmidt, Jr. |
| 2,682,236 A | | 6/1954 | Holmstrom et al. |
| 2,735,143 A | | 2/1956 | Kearns |
| 2,766,861 A | * | 10/1956 | Abramson ........ E04F 13/0864 52/530 |
| 2,948,367 A | * | 8/1960 | Uglietto ............ E04F 13/0864 52/531 |
| 3,417,531 A | * | 12/1968 | Jones .................... A47F 5/0846 52/522 |
| 3,473,274 A | | 10/1969 | Godes |
| 3,760,545 A | | 9/1973 | Pearse et al. |
| 3,828,510 A | * | 8/1974 | Bettoli .............. E04F 13/0864 52/519 |
| 4,288,958 A | | 9/1981 | Chalmers et al. |
| 4,292,781 A | | 10/1981 | Chalmers et al. |
| 4,382,354 A | | 5/1983 | Gailey et al. |
| 4,411,117 A | | 10/1983 | Bolha |
| 4,958,471 A | | 9/1990 | Waddington |
| 5,214,895 A | * | 6/1993 | Fifield ...................... E04D 1/04 52/542 |
| 5,349,801 A | | 9/1994 | Verbofsky |
| 5,349,802 A | | 9/1994 | Kariniemi |
| 5,363,623 A | | 11/1994 | King |
| 5,394,672 A | | 3/1995 | Seem |
| 5,465,547 A | * | 11/1995 | Jakel ....................... E04D 1/04 106/608 |
| 5,685,117 A | | 11/1997 | Nicholson |
| 6,052,961 A | | 4/2000 | Gibbs |
| 7,168,215 B1 | | 1/2007 | Bednarczyk |
| 7,331,150 B2 | | 2/2008 | Martinique |
| 7,748,191 B2 | * | 7/2010 | Podirsky ................ E04D 3/40 52/541 |
| 8,006,456 B1 | | 8/2011 | Green et al. |
| 8,020,353 B2 | | 9/2011 | Gaudreau |
| 8,590,270 B2 | | 11/2013 | Martinique |
| 8,915,036 B2 | | 12/2014 | Vander Laan et al. |
| 9,267,289 B2 | | 2/2016 | Vander Laan et al. |
| 9,267,296 B2 | * | 2/2016 | Maurer ................ E04D 1/2916 |
| 9,605,432 B1 | | 3/2017 | Robbins |
| 9,926,704 B1 | | 3/2018 | Nowacek |
| 9,970,197 B2 | | 5/2018 | Maurer et al. |
| 10,280,624 B2 | * | 5/2019 | Lucas ....................... E04D 1/12 |
| 2004/0187434 A1 | | 9/2004 | Podirsky |
| 2007/0251177 A1 | | 11/2007 | Frahm et al. |
| 2010/0186334 A1 | | 7/2010 | Seem |
| 2014/0250815 A1 | | 9/2014 | Vander Laan et al. |
| 2015/0354217 A1 | | 12/2015 | Lucas |
| 2016/0123014 A1 | | 5/2016 | Vander Laan et al. |
| 2017/0234019 A1 | | 8/2017 | Culpepper et al. |

FOREIGN PATENT DOCUMENTS

| | | | | |
|---|---|---|---|---|
| FR | 423805 | | 4/1911 | |
| FR | 2696771 | | 12/1994 | |
| GB | 1119204 | | 7/1968 | |
| GB | 1353902 A | * | 5/1974 | ............ E04B 9/22 |
| GB | 2 241 520 | | 9/1991 | |
| JP | 2001-295422 | | 4/2003 | |
| JP | 4659413 | | 3/2011 | |
| WO | 92/16972 | | 10/1992 | |

* cited by examiner

METHOD AND APPARATUS FOR INSTALLING ROOFING SHINGLES

CROSS-REFERENCE TO RELATED APPLICATION

This application claims priority to U.S. Provisional Application No. 62/900,690, filed Sep. 16, 2019; which is expressly incorporated herein by reference.

FIELD OF THE DISCLOSURE

The present disclosure relates to residential roofing shingles and a top-down, or top-to-bottom, method for installing them.

DESCRIPTION OF RELATED ART AND SUMMARY OF THE DISCLOSURE

A few top-down residential roofing shingles and installation methods have been designed before, albeit without much commercial success. Consequently, the practice of top-down roofing is not well known. Typically, the approach used for shingle installation is bottom-up, or bottom-to-top; that is, where a roofer nails a first row of shingles across the bottom edge, or "eave", of a roof plane, then proceeds to nail a second row of shingles just above the first row—making sure to overlap the previous row slightly in order to permit the natural flow of rainwater off the roof. Thereafter, a roofer nails a new row of shingles just above the previous one—and so on, from the bottom eave to the top edge, or "ridge", of that roof plane. Since almost all styles of roofing shingles (asphalt, wood shake, metal. clay, and slate, for example) are designed to accommodate this method, the bottom-up manner is widely accepted as the standard method of shingle installation.

By contrast, top-to-bottom roofing refers to a method whereby a roofer installs shingles from the ridge to the eave; that is, starting installation of shingles at the top of a roof and moving down, row by row down to the eave, until the roof plane is fully covered with shingles. In spite of the fact that other top-to-bottom roofing shingles and associated installation methods have been attempted, they have not been broadly accepted in the industry. In contrast to them, the present disclosure dramatically simplifies both the design of the products used, as well as the ease of their installation. In this unique way, roofers and homeowners alike may enjoy many advantages inherent in a top-to-bottom shingle system, as will be described below.

The present disclosure combines the use of shingles and battens to complete a typical residential roof. Simple wooden battens are commonly used in the installation of many heavyweight shingle applications—for clay and concrete tiles, especially. Common battens are typically made of solid wood in a simple rectangular shape (usually 1"×2"), and are often 48" to 96" long. These battens are typically nailed into a roof deck prior to the addition of the very heavy clay or concrete tiles both 1) to help position the shingles evenly, parallel to the eave-line of the roof, as well as 2) to help prevent these heavy shingles from sliding off the typical slope of a traditional residential roof.

By contrast, the engineered battens contemplated by the present disclosure—which may be solid or hollow—are designed 1) to help position the complementary lightweight, engineered shingles evenly, parallel to the eave-line of the roof, 2) to provide a snap-fit secure engagement mechanism for attaching the aforementioned complementary shingles to the roof deck, and also 3) to initially provide more secure footing for a roofer—much like scaffolding on the roof deck—that will permit the roofer to do his inherently dangerous job with a much enhanced degree of safety.

"Snap-fit" as used herein refers to the standard assembly method used to attach flexible parts, usually plastic, by pushing the parts' interlocking components together. In general, a snap-fit comprises a protruding, male part of one component, e.g., a hook, stud or bead, which is deflected briefly during the joining operation and catches in a complementary female depression in the mating component, often producing a snapping sound. After the joining operation, the snap-fit features return to a stress-free condition, while holding the two complementary pieces in place.

The battens of the present disclosure not only provide a roofer with the ability to establish regular, parallel, vertical spacing guides for his impending installation, they do so in a way that greatly reduces his risk of slipping and/or falling off the roof. In the initial preparation of any roof plane contemplated by the present disclosure, a roofer would nail battens horizontally across the roof starting at the bottom edge, then space additional battens at regular vertical intervals above the edge until the roof plane is fully equipped with parallel rows of battens—ready to receive the shingles that will be correctly aligned with, and securely attached to, said battens.

The engineered plastic shingles of the present disclosure are uniquely designed to be easily and securely snap-fitted onto the battens without the use of nails.

The pre-aligned, parallel battens assist the roofer in assuring the quality of the installation, since the shingles attached to the battens 1) will assuredly be parallel to the eave of the roof plane, 2) will assuredly be horizontally aligned with all the other shingles in their row, and 3) will be securely attached to the roof deck via the battens that are fastened to the roof deck with nails.

The batten nails affix the battens to the roof deck, and the battens interlock with the shingles; therefore, the batten nails hold the individual shingles securely to the roof deck, though indirectly—without having to nail the shingles individually into the roof. Furthermore, in a top-to-bottom installation, battens possess an additional advantage: they act effectively as foothold scaffolding on the sloped roof deck. As such, they provide a new and more reliable form of traction on the roof deck—greatly enhancing the roofers' security, and perhaps more importantly, his/her sense of security. As a result, the present disclosure provides the following advantages over prior art versions of top-to-bottom roofing:

1) Simplifies installation of roofing shingles;
2) Improves ease of correctly positioning shingles on the roof;
3) Reduces number of nails used to secure shingles and battens to the roof;
4) Reduces time to correctly apply new shingles to the roof;
5) Eliminates the possibility of vertically-adjacent shingles buckling;
6) Improves ease in replacing a damaged shingle during the life of the roof and
7) Reduces a roofer's risk of slipping and/or falling off a roof by:
   a. Eliminating the need for roofers to balance themselves on a sloped roof while standing on top of any other potentially slippery shingles below; and b. Providing the much needed additional security of battens as footholds—especially on steeper slopes—as the roofer installs the shingles above his stance.

These battens function as a form of built-in scaffolding to the surface of any roof slope, providing extra security against slips and/or falls off the roof. Using this strategy of top-to-bottom roofing, a scaffold-like batten would be available on all sloping planes of the roof deck, enhancing roofers' safety while installing shingles from top to bottom (until the roofer completes the installation of shingles on the bottom row from his ladder or other ground-based scaffolding).

The present disclosure provides a system in which shingles may be installed in a top-to-bottom manner, after specially designed battens have first been positioned and nailed in place. In this system, each shingle is attached to the roof deck by simply and easily sliding it into the open or female portion of a batten, eliminating the need to nail down any individual shingle. Then, by interlocking each shingle with the one just previously installed, and by simultaneously sliding the forward edge of said shingle underneath the rearward edge of previously installed shingles in the row just above it, the present shingle-batten disclosure provides a roofing system whereby a roofer can completely shingle all the surfaces of a typical roof without nailing a single shingle.

In the end, after the roof installation with the present invention is complete, all attached shingles are free to breathe—i.e., to expand or contract naturally in any direction when the ambient temperature fluctuates—without any risk of buckling or warping since they are attached securely to the roof (through battens), but not nailed. While they are indirectly held down against the roof deck by the force of the batten nails, these shingles are not constrained from growing slightly forward and backward, or slightly leftward and rightward, as the natural forces of expansion and contraction dictate with ambient temperature fluctuations. Finally, in the unlikely event that any individual shingle of a roof becomes damaged over time (by a fallen tree limb in a sporadic windstorm, for example), that individual shingle can be removed and easily replaced with a new one.

BRIEF DESCRIPTION OF THE DRAWINGS

The present disclosure will be best understood with reference to the accompanying drawings, in which.

DETAILED DESCRIPTION

The present disclosure comprises a plurality of shingles and battens that operate together to provide a shingle system for a roof. Specifically, the present disclosure comprises a top-to-bottom, interlocking shingle-and-batten system for roof installation. Two examples of this system are disclosed.

Figure 1:
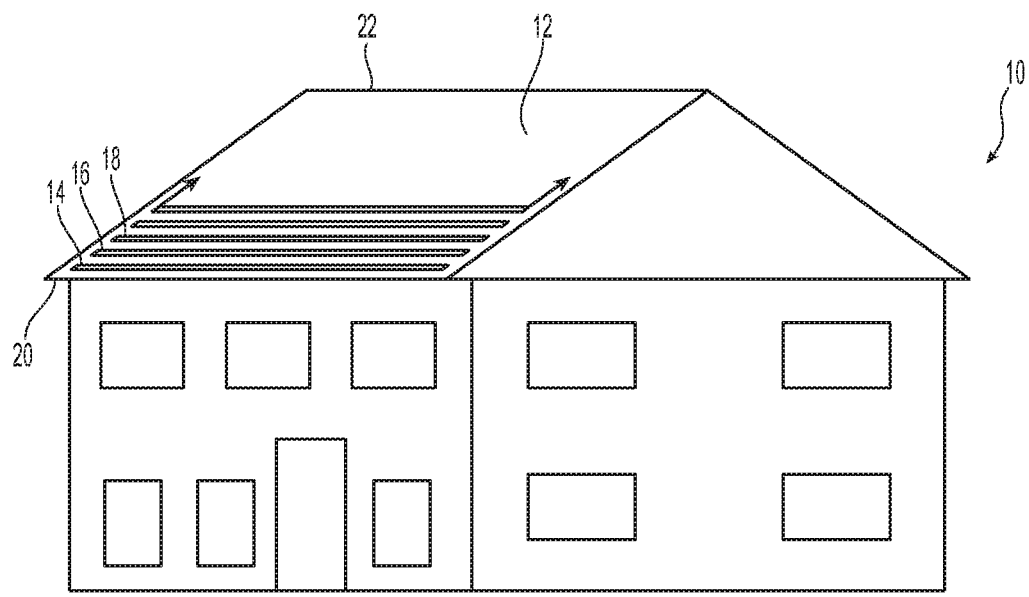
FIGS. 1-2 are schematic representations of a building showing the general installation of battens in a bottom-up, or bottom-to-top, manner, as indicated by the arrows, of the shingle system of the present disclosure.
Figure 2:
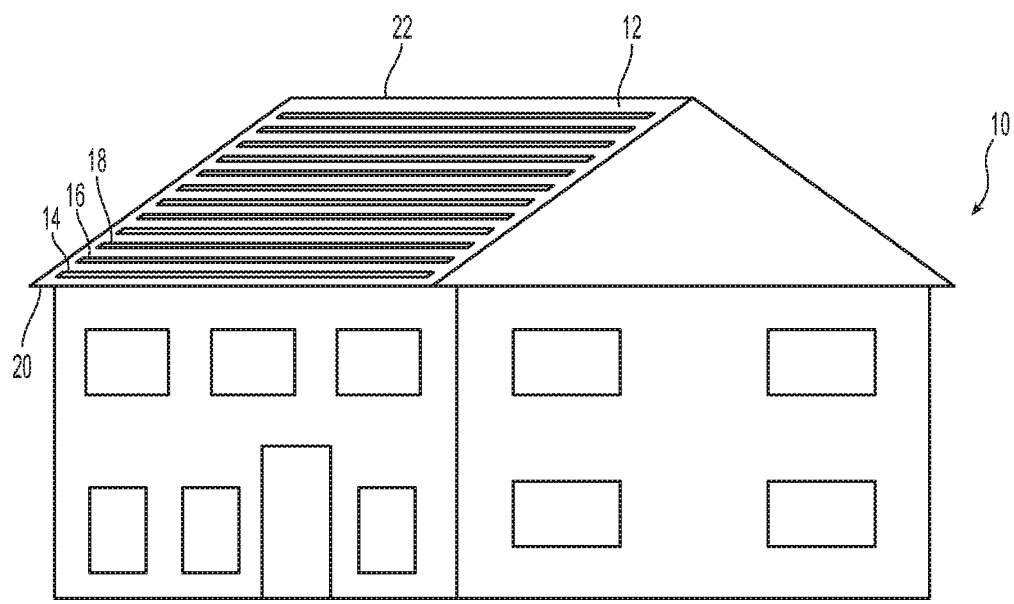

Referring to FIGS. 1 and 2, reference numeral 10 generally indicates a building structure which has a plurality of battens installed on roof deck 12. Building structure 10 is not limited to a specific size or type of construction. Roof deck 12 extends from roof ridge 22 to roof eave 20 and is not limited to a particular positive slope. That is, roof deck 12 may extend from roof ridge 22 to roof eave 20 at pitches of varying positive slopes or steepness. Initially, battens are installed in a bottom-to-top manner on roof deck 12, beginning adjacent to roof eave 20, and continuing in regular intervals in a generally upward direction towards the roof ridge 22. Lowermost batten 14 is installed, followed by batten 16, followed by batten 18, and so forth, at regular vertical intervals, —in 12" intervals, for example—between battens. Roofers assure that battens are installed parallel to one another in this manner until the uppermost batten is placed at a distance less than or equal to one interval prior to reaching roof ridge 22. The material of the battens is not limited and may include any material, such as plastic, metal, wood, or the like.

Figure 3:
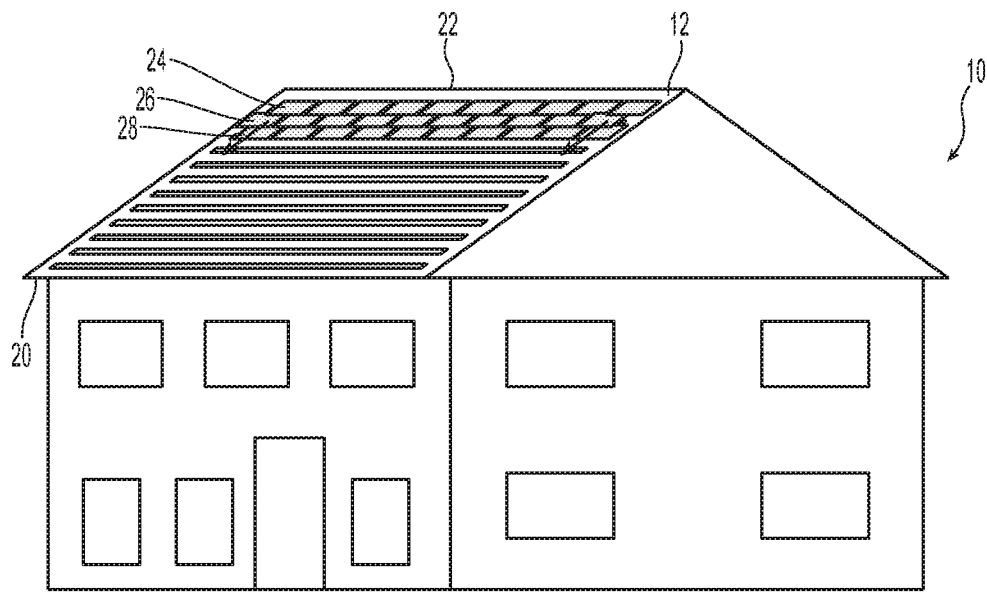
FIGS. 3-4 are schematic representations of a building showing the general installation of shingles in a top-down, or top-to-bottom manner, as indicated by the arrows, of the shingle system of the present disclosure.
Figure 4:
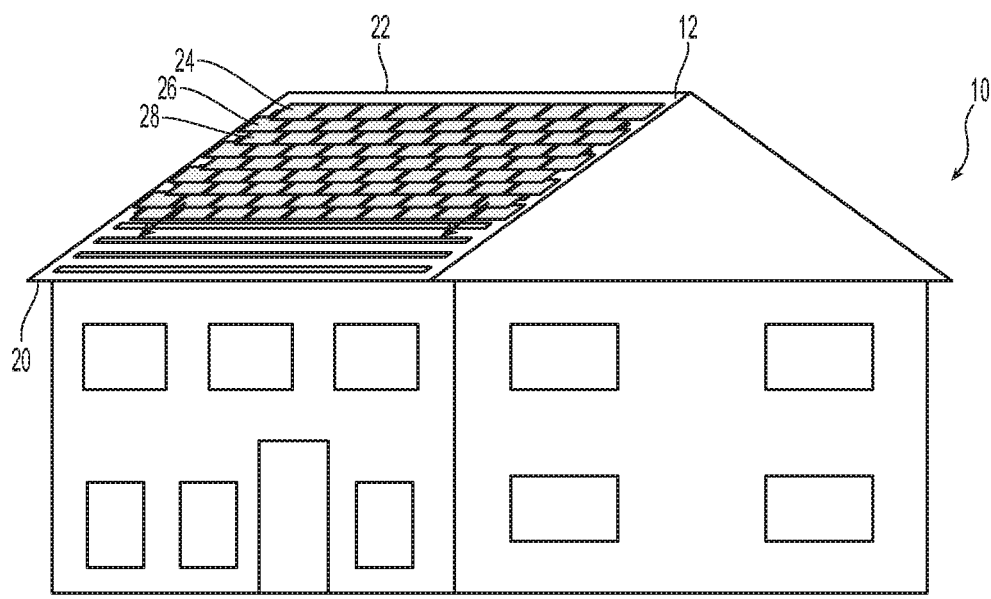

Referring to FIGS. 3 and 4, once all battens are installed on roof deck 12, an individual field shingle is installed by laying it over the uppermost batten and then sliding it across that batten generally upwardly toward the roof ridge 22, until it fits snugly into the batten, as will be described in greater detail below. Field shingles, which are those typically installed across the planes of a roof deck, will be generally referred to as "shingles". Trim shingles (not shown) may be used to cover eaves, ridges, hips, gables and other non-planar parts of the roof as is customary and would be understood by a person of ordinary skill in the art.

Shingles are preferably installed left-to-right, across the entirety of the batten in the uppermost row of shingles 24, which is adjacent to roof ridge 22. Shingles in row 24 are followed by shingles installed in a second row 26, followed by a third row 28, and so on, until reaching lowermost batten 14 This top-to-bottom method of shingle installation is preferable over typical bottom-to-top shingle installation methods because it increases roofer safety and ease of work, improving both the quality of the work and the productivity of the roofer in the process. This method also ensures a high degree of aesthetic quality since parallel battens are installed prior to the installation of any shingles. Once parallelism is established by installing the battens, consistent vertical spacing between adjacent rows of shingles and consistent horizontal alignment of adjacent (and interlocked) shingles in the same row is assured. This system greatly reduces much of the time associated with a roofer's repeated evaluation of each individual shingle's positioning for parallelism between rows and alignment within any one row. The material of the shingles is not limited and may include any material suitable for roofing, such as plastic, metal, wood, clay, cement, asphalt, composite, concrete, silicon panels or the like.

Referring again to FIG. 4, lower shingle row 26 and upper shingle row 24 demonstrate the spatial relationship between shingles installed in vertically adjacent rows on roof deck 12.

Figure 5:
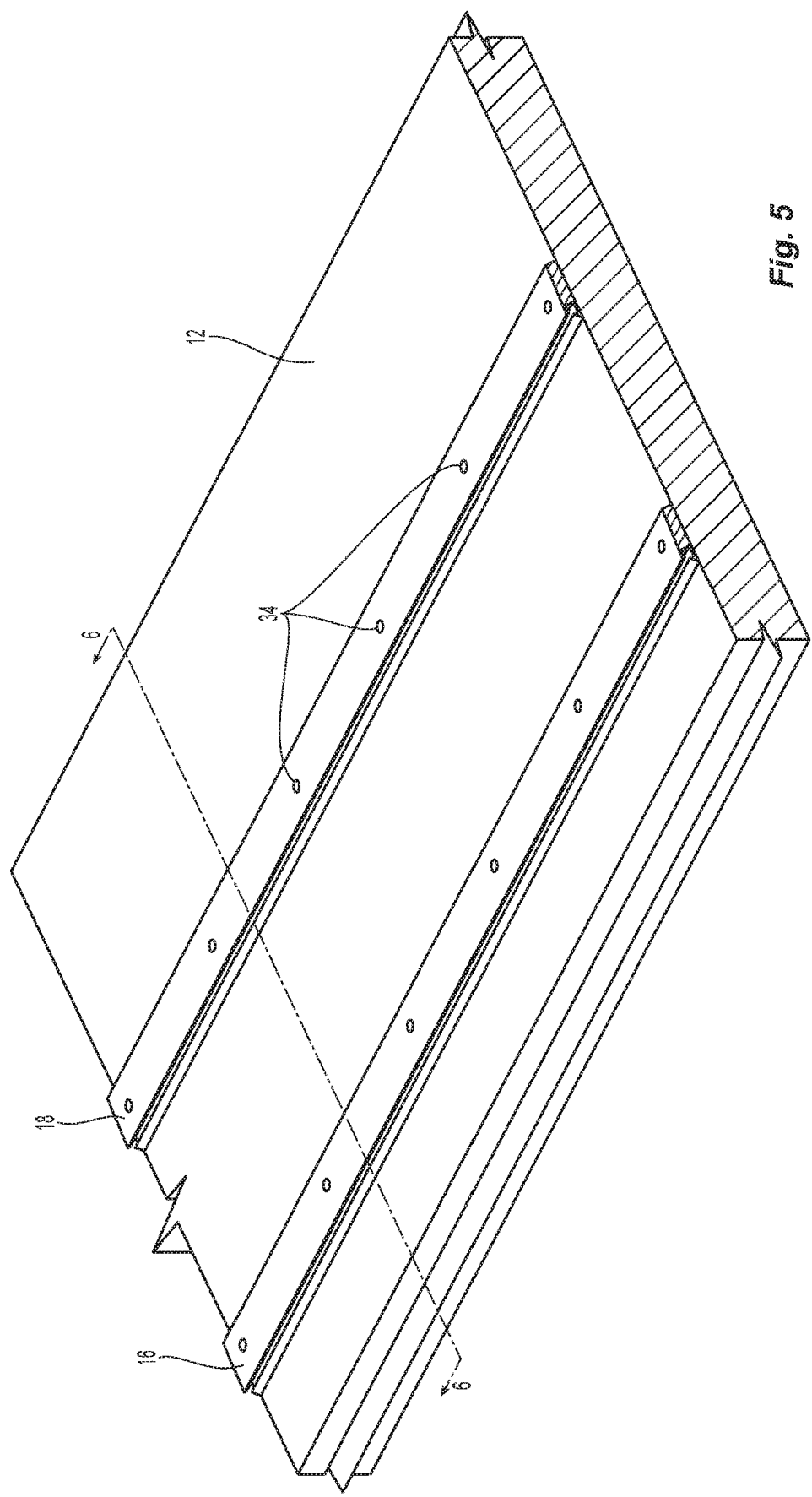
FIG. 5 is an enlarged perspective view of a portion of the roof of FIGS. 1-4 showing battens prior to installation of any shingles.

FIG. 5 shows a portion of a first example of two installed battens 16 and 18 on roof deck 12 prior to installation of shingles. Battens 16 and 18 have a generally elongated rectangular shape. In this first example, the battens 16 and 18 are shown as solid, but they may be hollow as in the second example to be described below. The battens may be secured to roof deck 12 with standard fasteners 34 used in the roofing industry, whether that is galvanized roofing nails, copper roofing nails, standard roofing screws, or the like, as is well known by a roofer of ordinary skill. These fasteners may be selected to match the expected longevity of the roofing material and/or to comply with local building codes. For ease in explanation, the various types of fasteners will collectively be referred to in the specification and claims as "nails", and the process of securing fasteners to the roof will be referred to in the specification and claims as "nailing".

Figure 6:
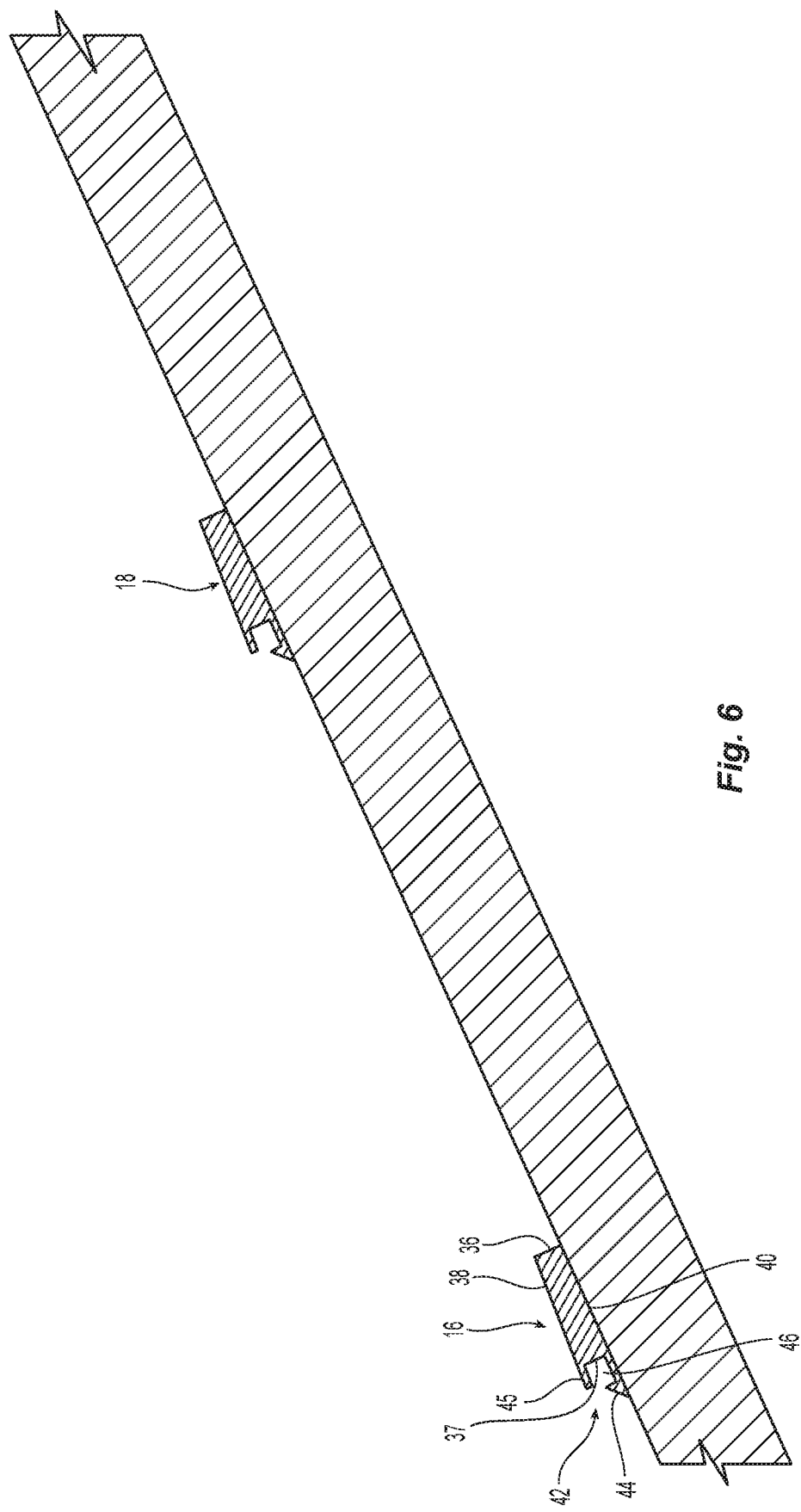
FIG. 6 is a cross-sectional view of FIG. 5 taken along line 6-6 of FIG. 5.

FIG. 6 is a cross-sectional side view of FIG. 5. In this example, each batten may have a forward surface 36, a rear surface 37, a top surface 38, a bottom surface 40, and a female mating area generally indicated by reference numeral 42. In a second example, described below, the battens are hollow and thus may not have a bottom surface. Mating area 42 may for example comprise an upwardly pointed batten hook 44, a batten flange 45 extending rearwardly from rear surface 37 towards the eave 20 of the roof, and a batten opening 46 located between batten hook 44 and batten flange 45. Batten hook 44 extends rearwardly from rear surface 37, with batten hook 44 located opposite flange 45.

Figure 7:
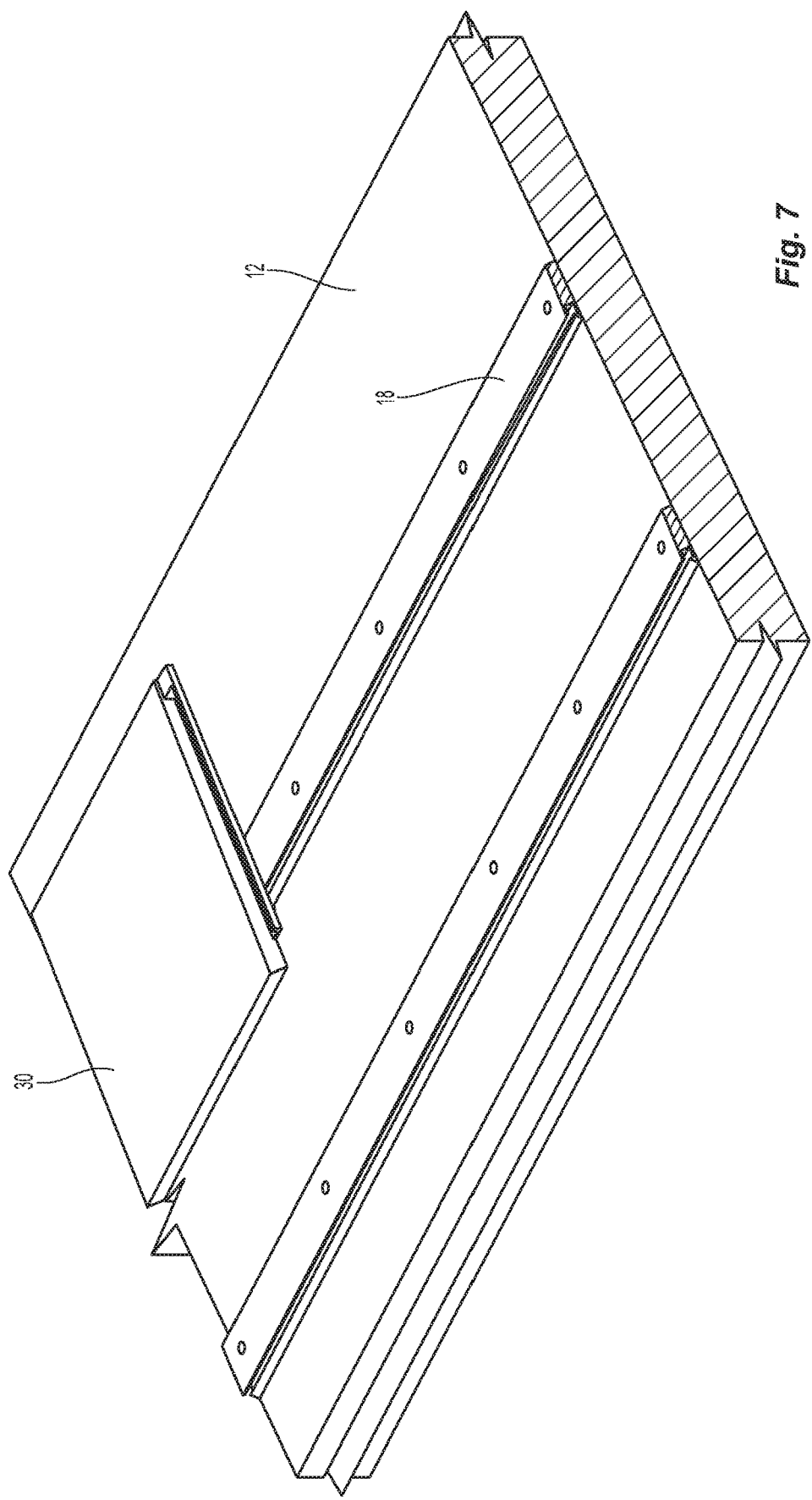
FIG. 7 is a view similar to FIG. 5 showing an installed shingle.

FIG. 7 is similar to FIG. 5 and illustrates a shingle 30 installed on batten 18. Rows of shingles may be installed beginning at the left lateral edge of roof deck 12.

Figure 8:
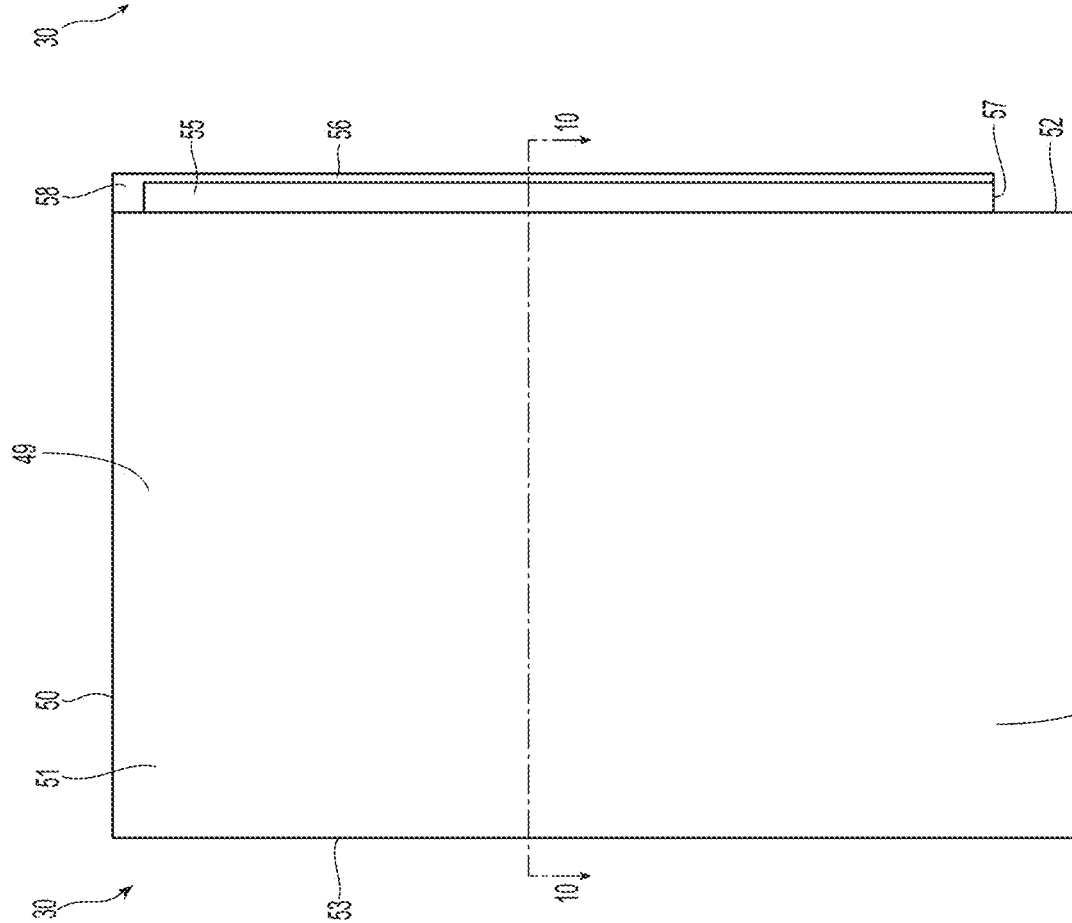
FIG. 8 is a top view of a single shingle.

FIG. 8 shows an enlarged top view of shingle 30. Each shingle has a generally rectangular shape and includes a top surface 51, a front portion 49 having a front edge 50, a rear portion 47 having a rear edge 54, a right side edge 52 and a left side edge 53. Each shingle also may have a gutter system including an up gutter 55 attached to right side edge 52. Gutter 55 has a raised outer edge 56, an open lower edge 57, and a gutter dam 58. The structure of gutter 55 allows water to run off of the roof without falling in the gaps between horizontally adjacent shingles. The size of each shingle is not limited and may, for instance, vary in length, width, profile height and/or profile shape (flat versus curved shape, for example).

Figure 9:
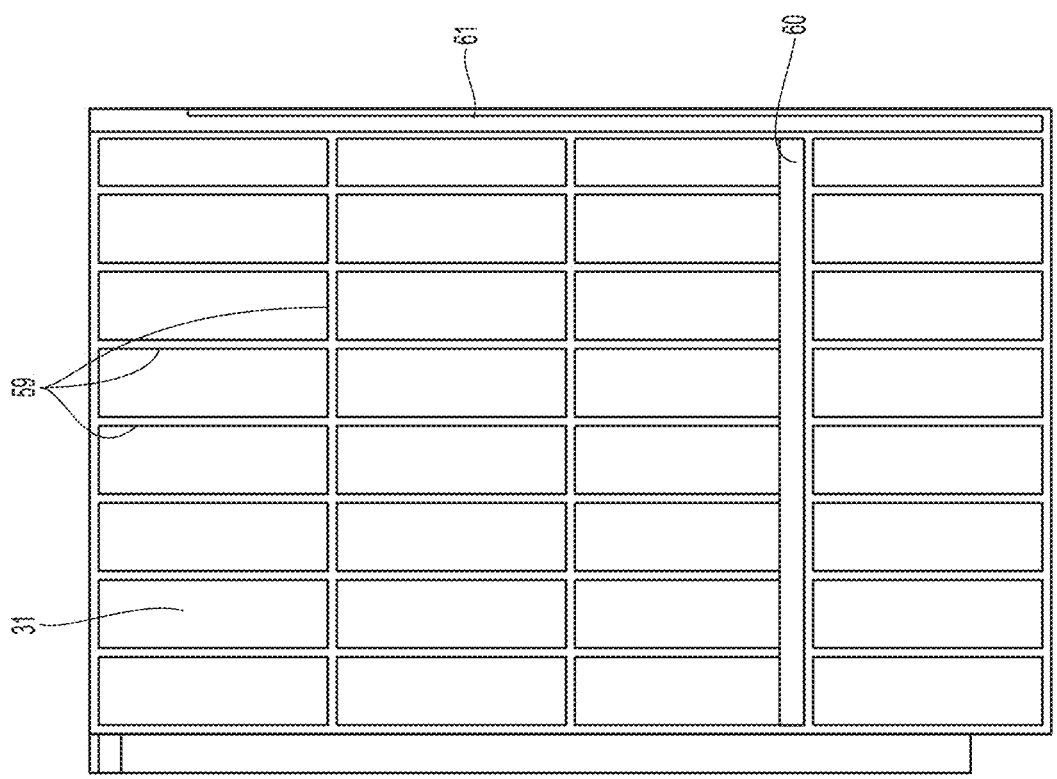
FIG. 9 is a bottom view of a single shingle.

FIG. 9 shows an enlarged bottom view of shingle 30. The bottom surface 31 of each shingle may include vertical, horizontal or diagonal reinforcing ribs 59 which are spaced throughout the bottom surface of the shingle. The arrangement of reinforcing ribs 59 is not limited to being evenly spaced and the space between adjacent ribs may vary. A mating edge 61 forms a down gutter and is located on the bottom surface and is parallel to the left edge 53. A mating prong 60 projecting from the bottom surface of the shingle and towards the ridge 22 of the roof is designed to engage in a snap fit with batten 16, as will be described.

Figure 10:
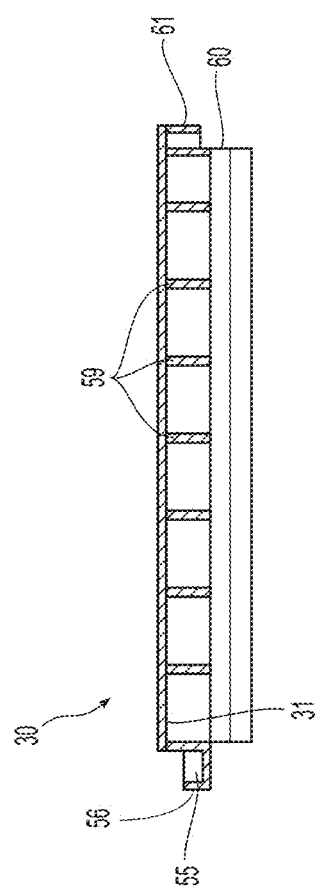
FIG. 10 is a cross-sectional view taken along line 10-10 of FIG. 8.

FIG. 10 is a cross-sectional view of FIG. 8 showing up gutter 55, reinforcing ribs 59, mating prong 60 and mating edge or down gutter 61 of shingle 30. Up gutter 55 is adapted to fit with and be coupled to the down gutter 61 to form a gutter system upon installation of adjacent shingles.

FIGS. 11-14 are sequential and show shingle 30 being installed on roof deck 12. The method of installation may be described as follows.

Figure 11:
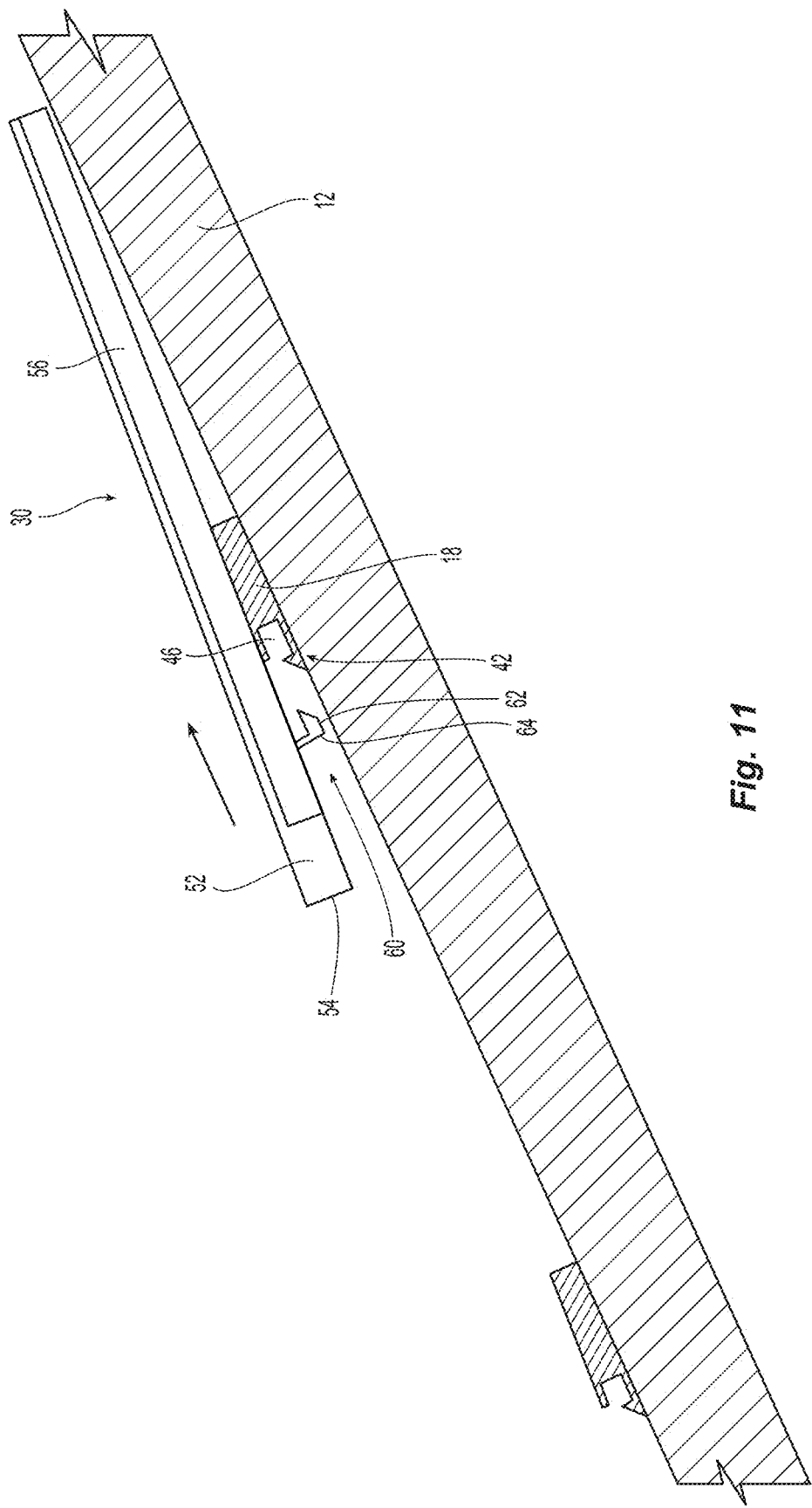
FIGS. 11-14 are similar to FIG. 6 showing installation of the shingle of FIG. 7.

Referring to FIG. 11, mating prong 60 may include a shingle hook 62 and a rear surface 64. Shingle 30 may be installed by inserting its mating prong 60 into mating area 42 of batten 18. Installation of shingle 30 may be completed by sliding the shingle generally upwardly across the batten toward the roof ridge 22, as will be described in greater detail below.

Figure 12:
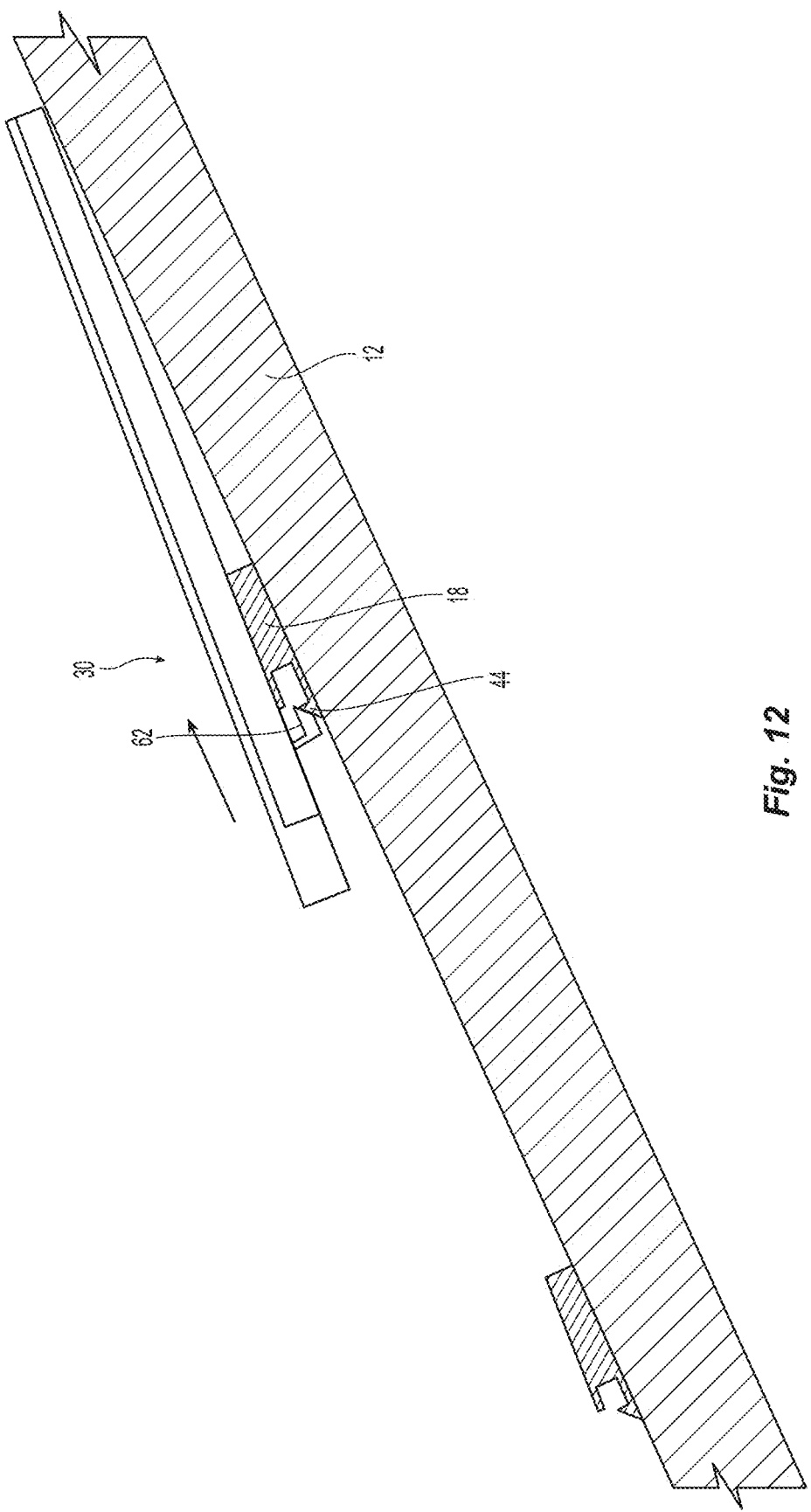

FIG. 12 shows shingle 30 extending in a generally upward direction until batten hook 44 and shingle hook 62 come into contact.

Figure 13:
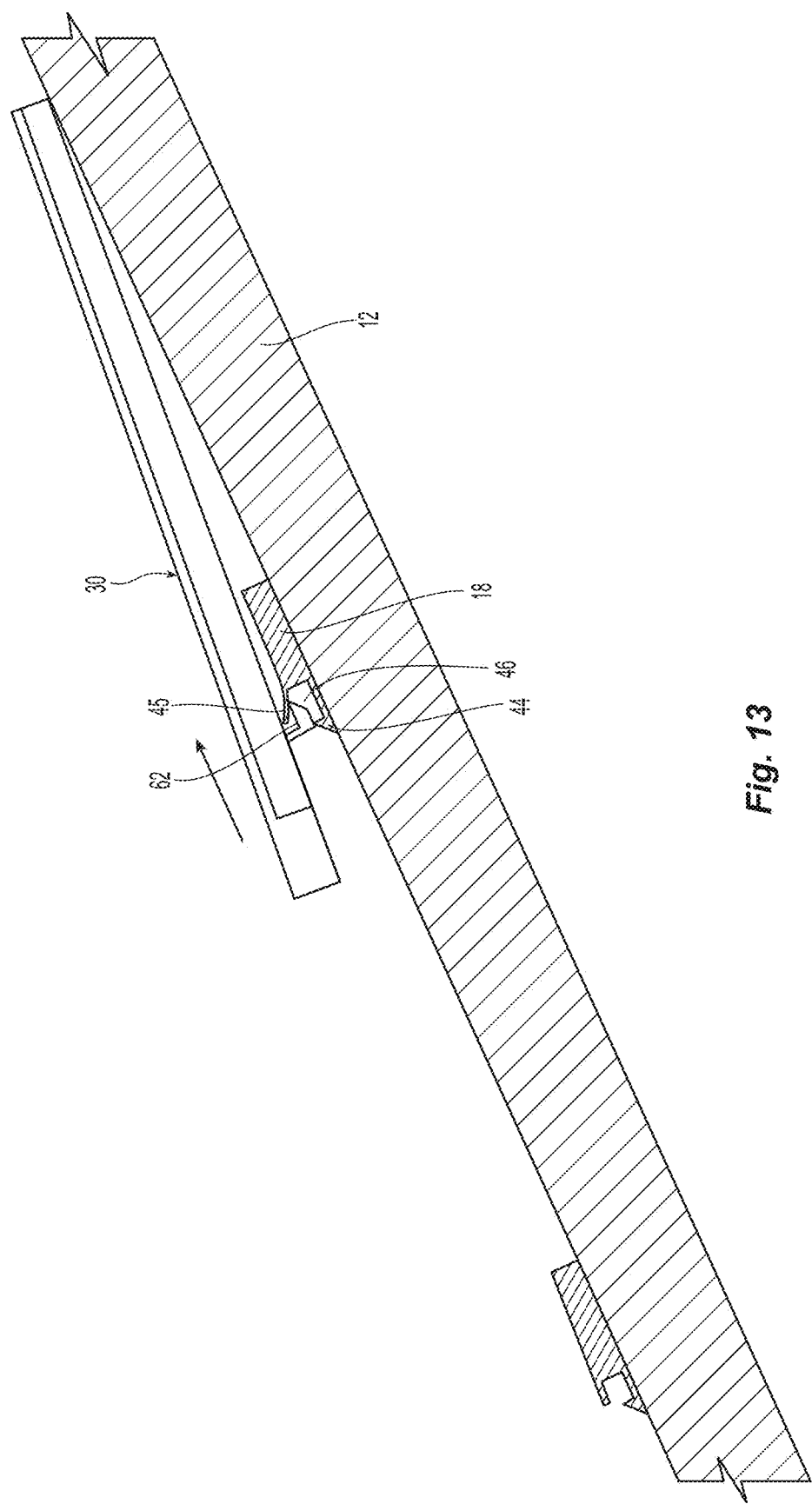

Referring to FIG. 13, once batten hook 44 and shingle hook 62 come into contact, batten hook 44 lifts shingle hook 62, which results in batten flange 45 flexing and rising as shingle hook 62 enters batten opening 46.

Figure 14:
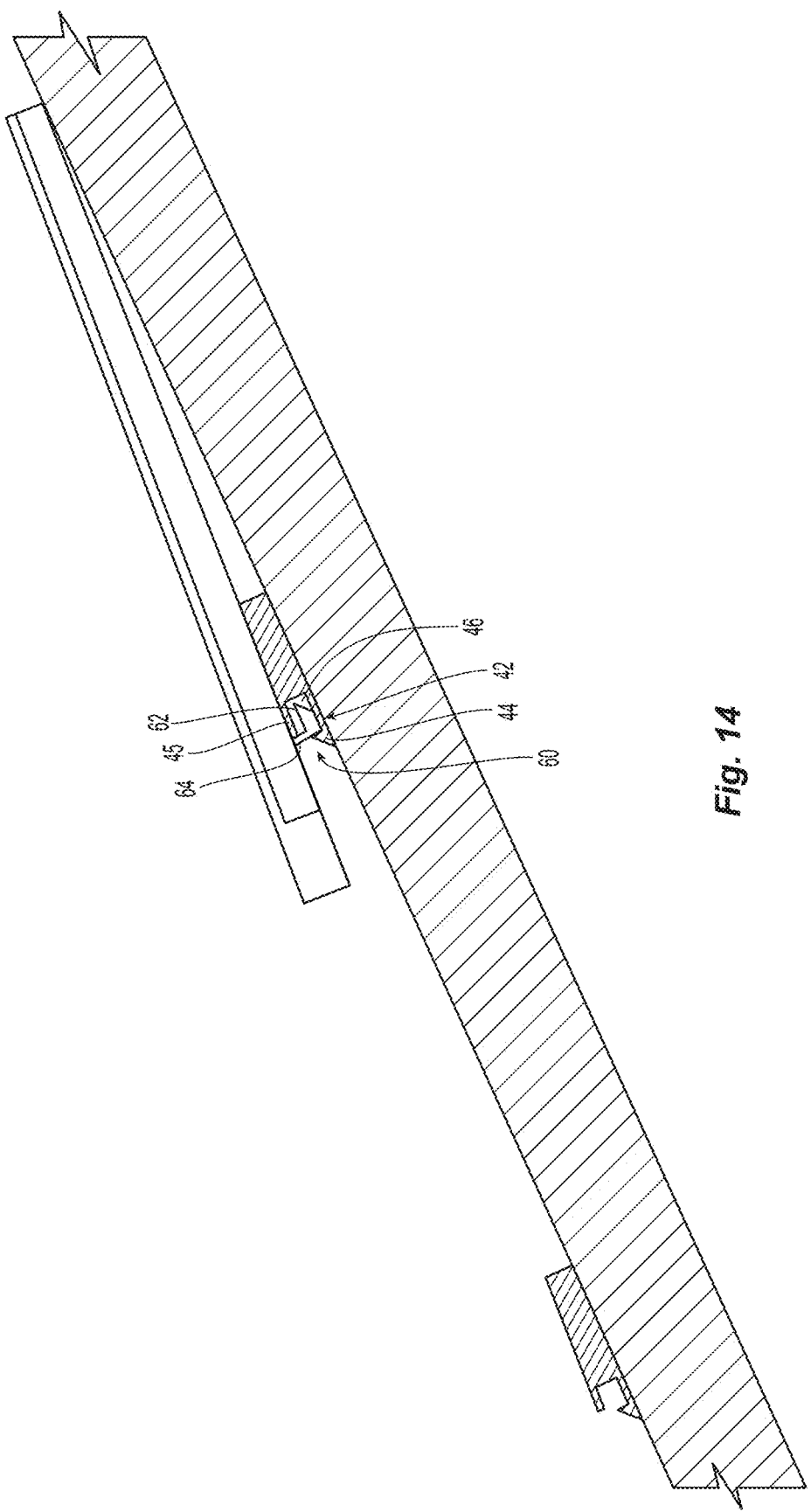

Referring to FIG. 14, which is sequential to FIG. 13, once shingle hook 62 is located within batten opening 46, batten 45 has lowered, and rear surface 64 rests against batten hook 44 in a snap-fit engagement. The shingle's mating prong 60 is thus engaged with batten hook 44, and interlocked and secured within batten opening 46 of mating area 42. The foregoing details of mating prong 60 and batten mating area 42 are exemplary, and many other configurations and structures may be employed to achieve the same result, a second example of which will be described below.

The snap-fit engagement as described above allows the shingle to be captured securely and held on the roof by the batten without requiring any additional nailing of the individual shingle by a roofer. This method of interlocking shingles to battens should substantially reduce the time, effort, waste, re-work and number of nails required to install a roof, enhancing the productivity of the roofer compared to traditional methods. In addition, shingles that are interlocked to battens without nailing the shingles is advantageous to a quality roof installation. Interlocking shingles with battens allows shingles to naturally expand and contract in changing ambient temperature conditions. By contrast, in the prior art, where a shingle is fixed in place by nails on its uppermost/leftmost side, and is fixed in place on its lowermost/rightmost side by another nailed down shingle, that shingle will not be permitted to "breathe," or to naturally expand and contract as its inherent thermal coefficient of expansion requires. A shingle that is constrained against expansion and/or contraction will be subject to a greater risk of buckling and/or tearing during freeze-thaw cycles, depending on the material with which it is made and the temperature variations it endures throughout its lifecycle on a house.

Figure 15:
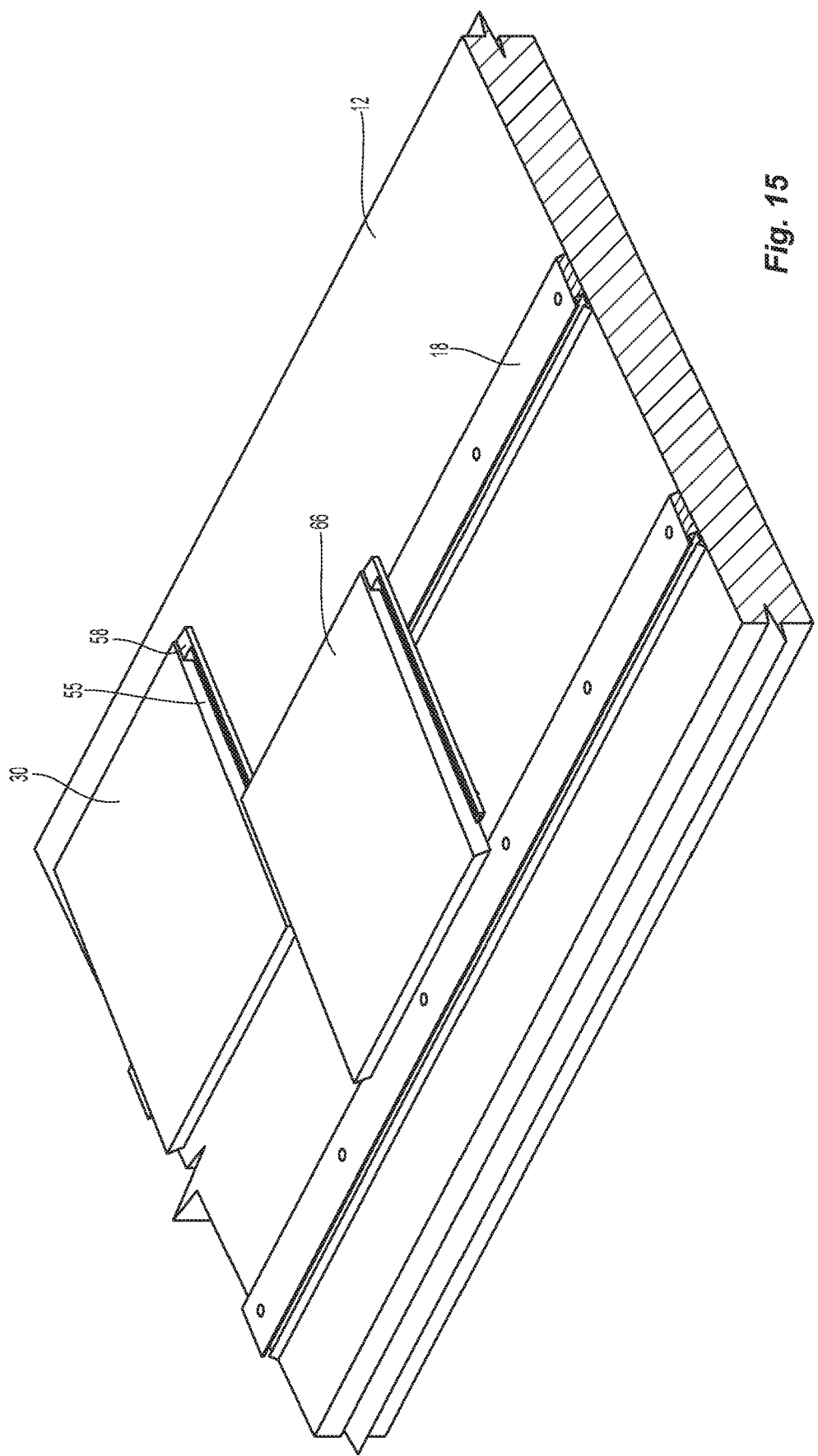
FIGS. 15-16 are similar to FIG. 7 showing installation of a second shingle.

FIG. 15 shows the installation of a second shingle 66. Gutter 55 of shingle 30 is coupled to mating edge 61 (see FIG. 9) of adjacent shingle 66 by being slid upwardly until reaching gutter dam 58 of shingle 30. At this point, the mating prong 60 of shingle 66 and batten mating area 42 of shingle 66 become engaged (see FIGS. 11-14), thereby creating both a vertical and horizontal interlock.

Figure 16:
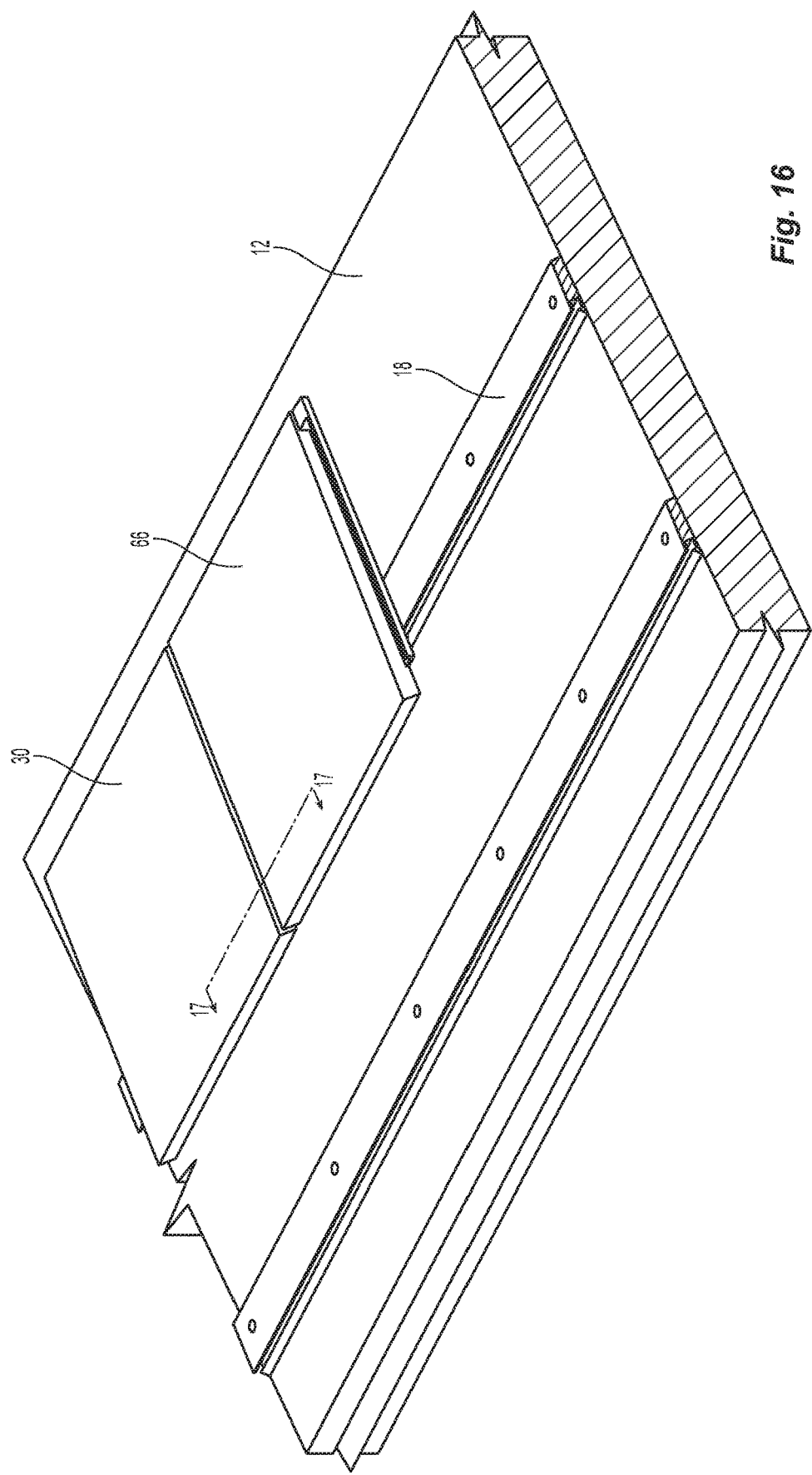

FIG. 16 is similar to FIG. 7, and shows second shingle 66 fully installed to the right of shingle 30.

Figure 17:
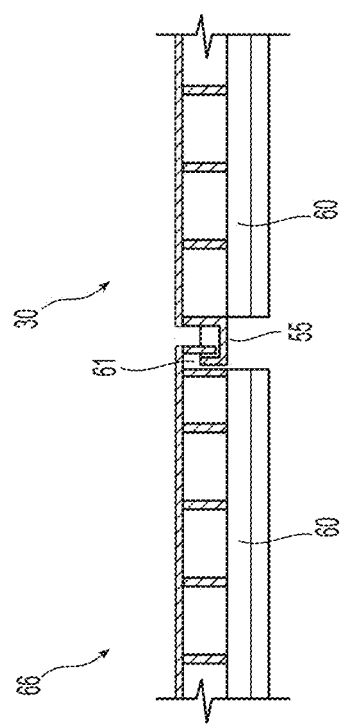
FIG. 17 is a cross-sectional view taken along line 17-17 of FIG. 16 showing the horizontal interlock between two adjacent shingles.

FIG. 17 is a partial sectional view of FIG. 16 showing the horizontal coupling between gutter 55 of shingle 30 and mating edge 61 of shingle 66.

Figure 18:
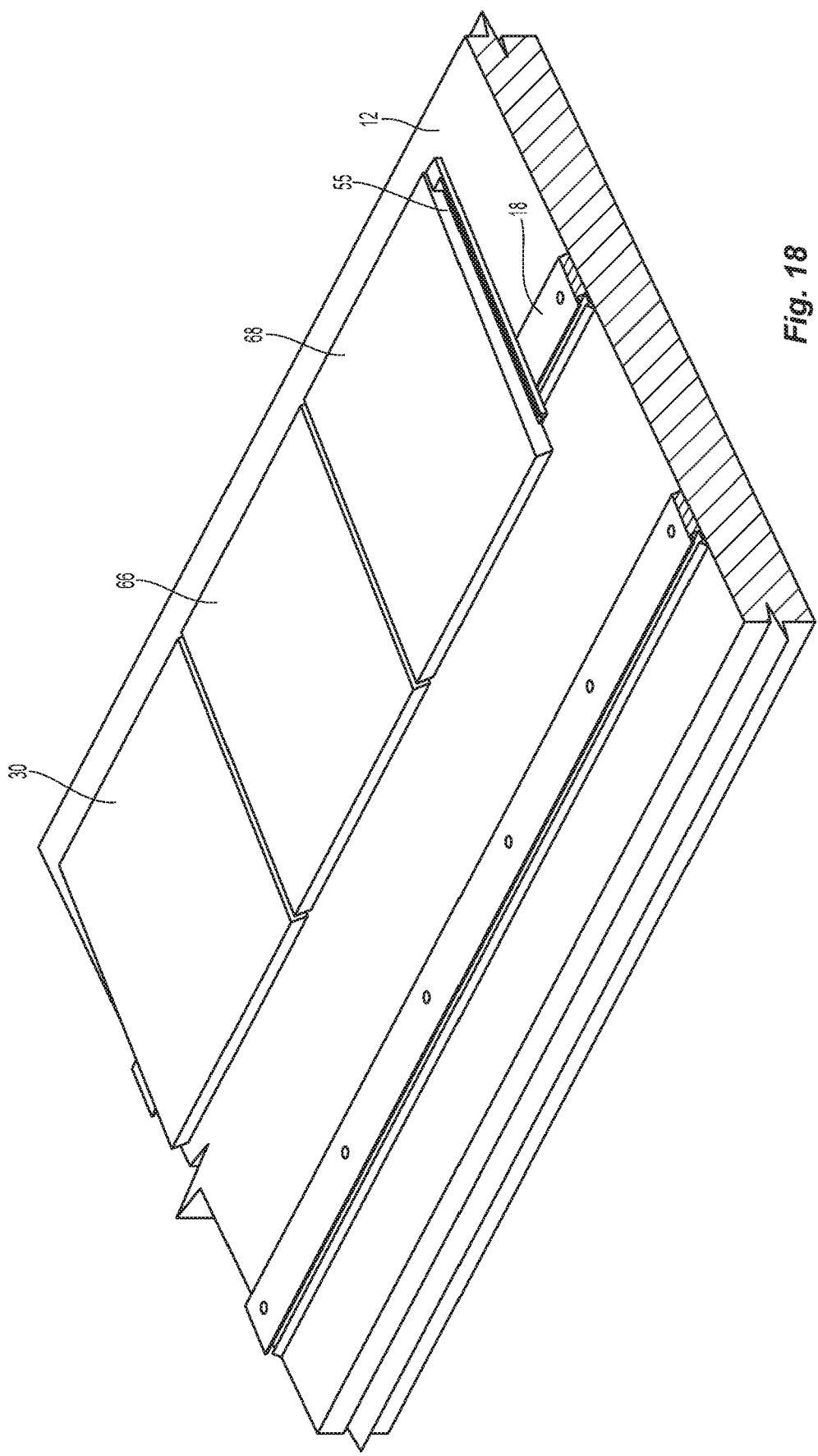
FIG. 18 is similar to FIG. 16 showing installation of a third shingle.

FIG. 18 is similar to FIG. 16 and shows the installation of a third shingle in a first row of shingles installed on batten 18 of roof 12. After second shingle 66 is installed next to first shingle 30, it is followed by third shingle 68, and continues rightwardly in a lateral direction, side-by-side, until a complete row of shingles is attached. Installation of shingles is not limited to installation from the left side of roof deck 12 to the right side of roof deck 12, although it is preferred in this configuration where shingle gutter 55 is on the right-hand side. However, where gutter 55 is located on the left side of the shingle, installation may, alternatively, be achieved in a right-to-left manner.

Figure 19:
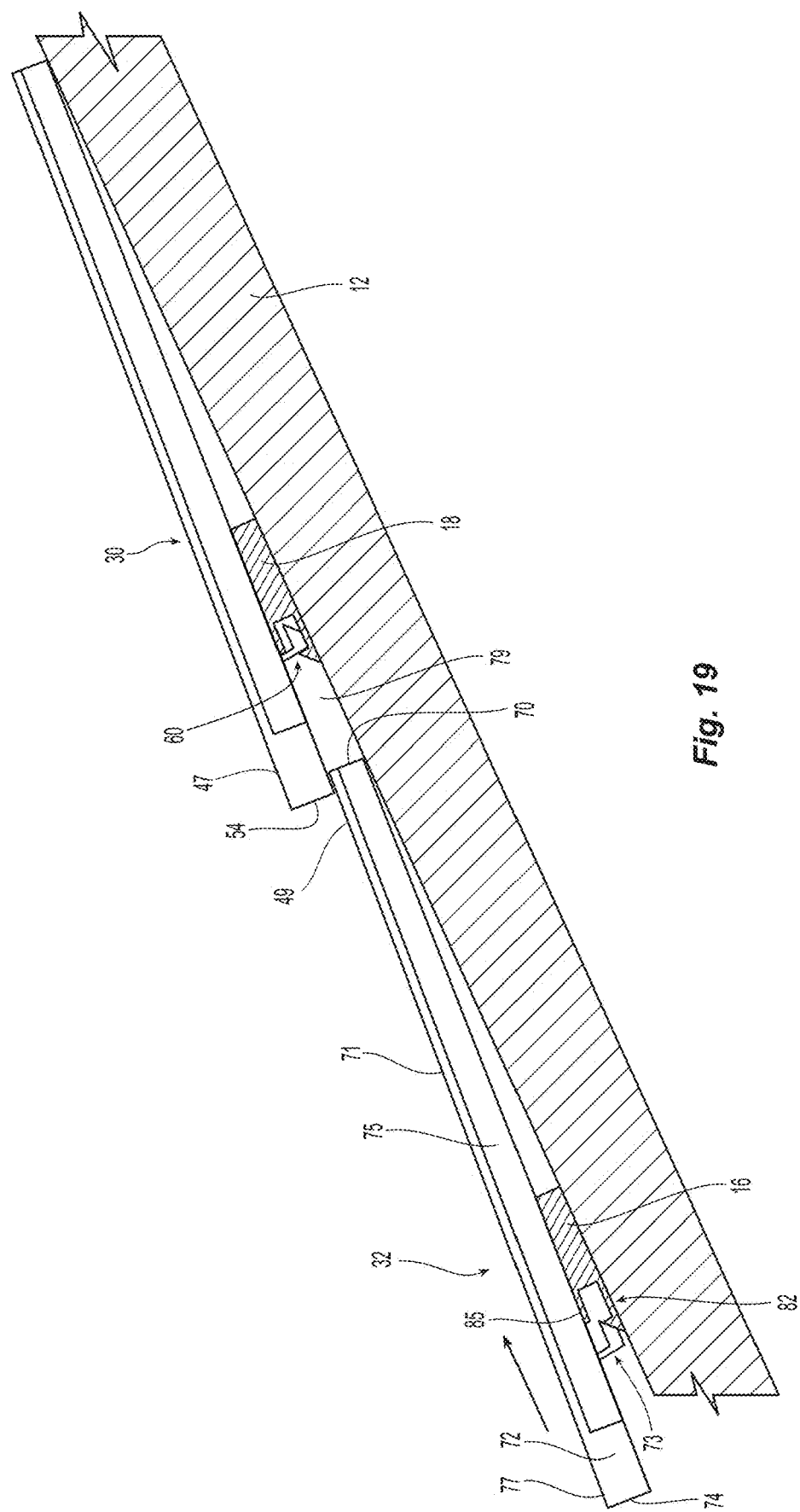
FIGS. 19-21 are similar to FIGS. 11-14 showing installation of a shingle in a second row, below the one previously installed above.
Figure 20:
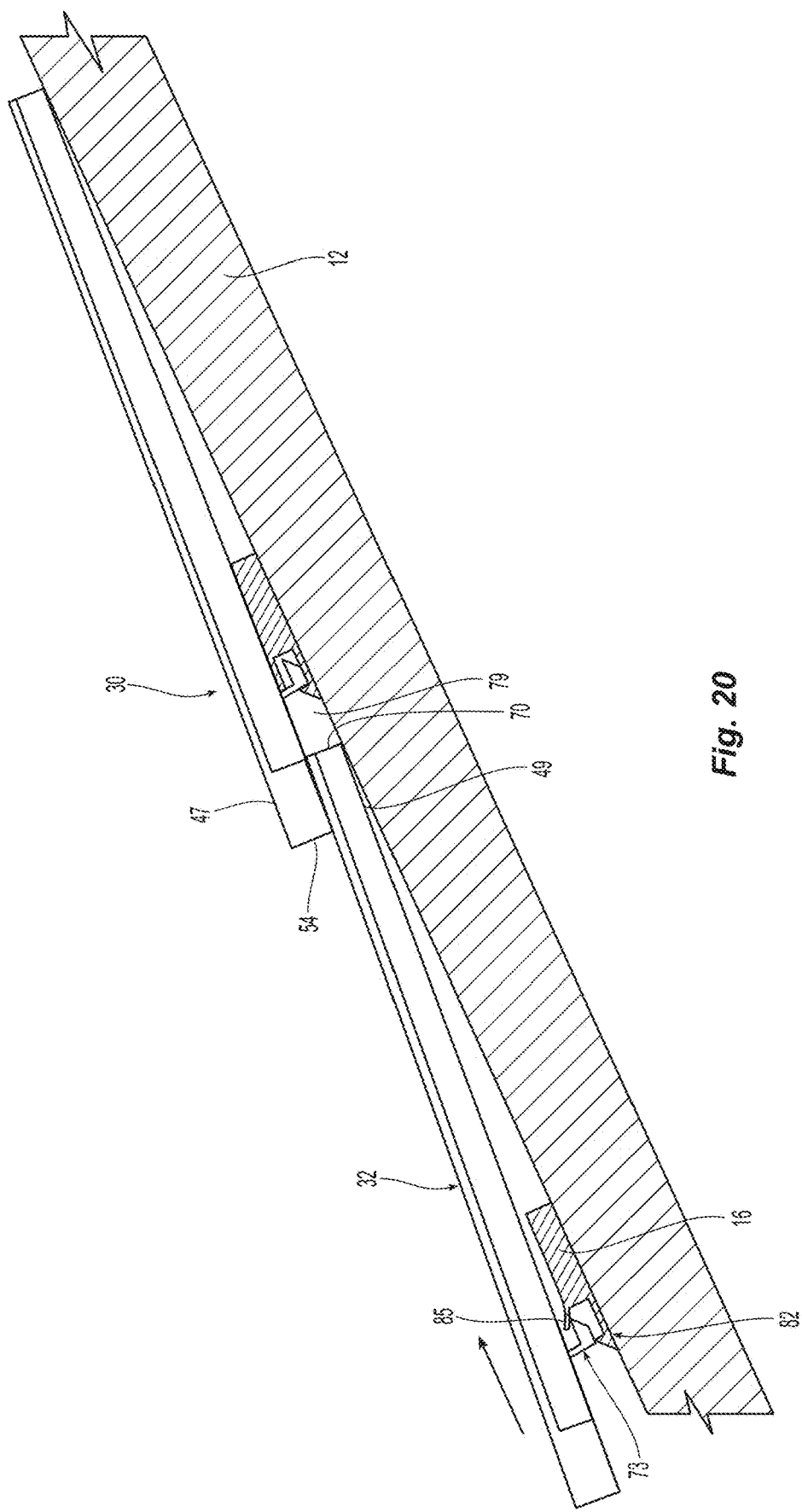
Figure 21:
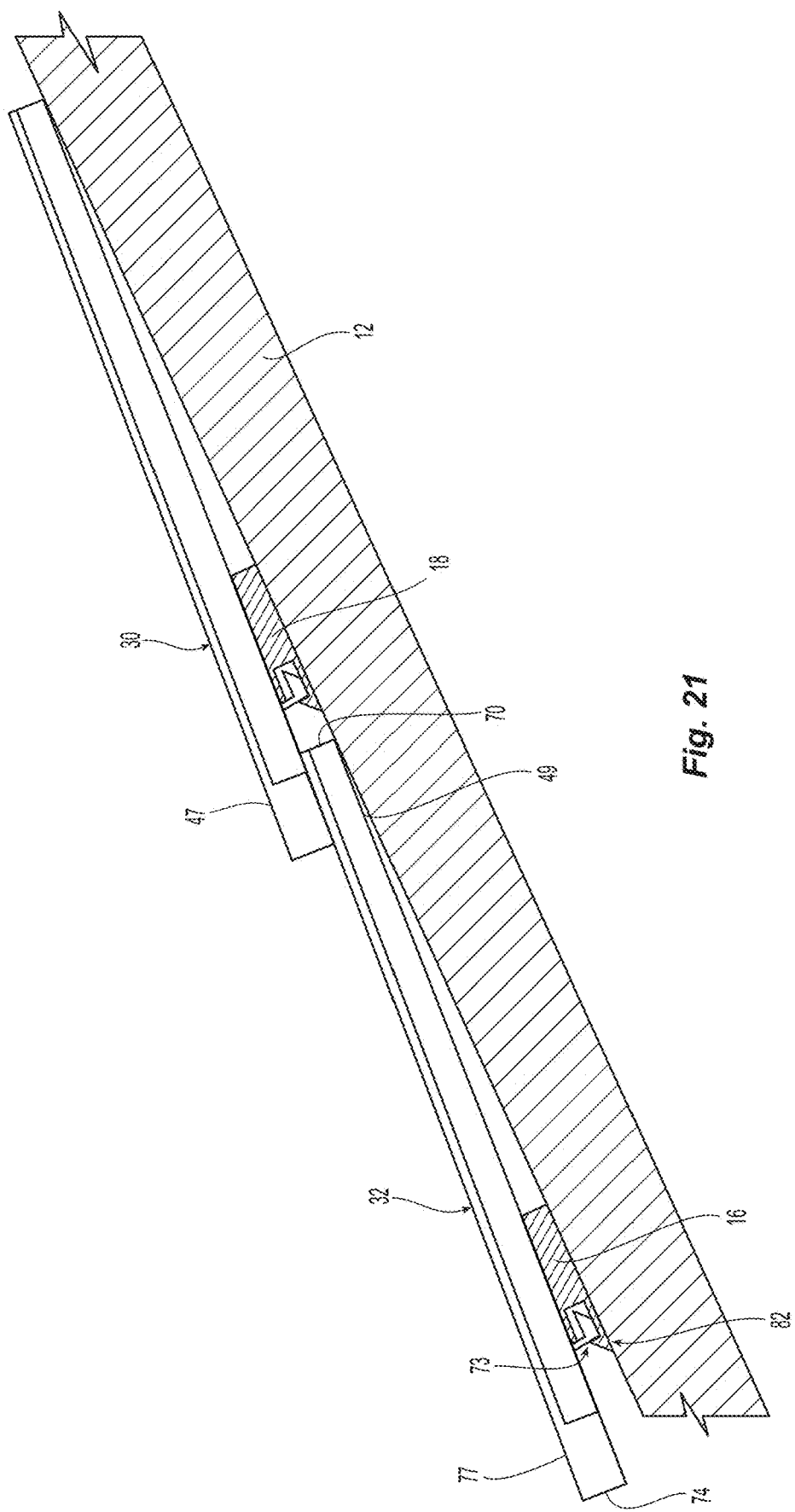

FIGS. 19-21 are similar to FIGS. 11-14 where lower shingle 32 is installed below upper shingle 30 using the same method as shown in FIGS. 11-14. For ease in explanation, shingle 32 may be referred to as a first shingle, while shingle 30 may be referred to as a second shingle.

Referring to FIG. 19, it illustrates first shingle 32 being installed on a lower batten 16. Shingle 32 has the same corresponding portions as shingle 30, i.e., a shingle mating prong 73, a top surface 71, a front portion 49 having a front edge 70, a rear edge 74 on rear portion 77, a left side edge 76 (shown in FIG. 22), a right side edge 72, a raised outer edge 75, and a ribbed surface on its underside. Likewise, batten 16 is similar to batten 18. Therefore, batten 16 has the same corresponding portions as batten 18, including a mating area 82 having a flange 85.

FIG. 19 shows the mating prong 73 of lower shingle 32 being inserted into the mating area, generally indicated by reference numeral 82, of batten 16 in a generally upward direction so that the front portion 49 of lower shingle 32 contacts roof 12 and is below rear portion 47 of upper shingle 30. In other words, top surface 71 of lower shingle 32 is inserted into an opening 79 that is formed between the front edge 70 of shingle 32, the rear portion 47 of upper shingle 30, batten 18 and its mating prong 60, and roof deck 12. Also, it is appreciated that battens 16, 18 each contact only one shingle, i.e., batten 16 contacts only shingle 32 and batten 18 contacts only shingle 30. In other words, first shingle 32 and second shingle 30 are coupled only to their respective first and second battens 16, 18, and are not coupled to each other.

FIG. 20 is similar to FIG. 13 in showing lower shingle 32 in the process of engaging with batten 16.

FIG. 21 is similar to FIG. 14 in illustrating mating prong 73 of lower shingle 32 snap-fit and fully interlocked within mating area 82 of batten 16. Note that batten 16 contacts only first shingle 32 and roof 12, while batten 18 contacts only second shingle 30 and roof 12, and first and second shingles 32, 30 are not coupled to each other. Moreover, shingle 32 is coupled only to batten 16, and shingle 30 is coupled only to batten 18. Front portion 49 of shingle 32 is positioned below rear portion 47 of shingle 30. Further, front portion 49 contacts roof 12. FIG. 21 also helps explain how shingle 32 of the present disclosure is allowed to "breathe" (expand and contract) after installation. That is, shingle 32 is constrained in only one place: at the location of the snap-fit, i.e., where the shingle mating prong 73 is fully interlocked with the batten mating area 82. Thus, shingle 32 will be able to expand from the snap-fit area to front edge 70, or from the snap-fit area to rear edge 74.

Figure 22:
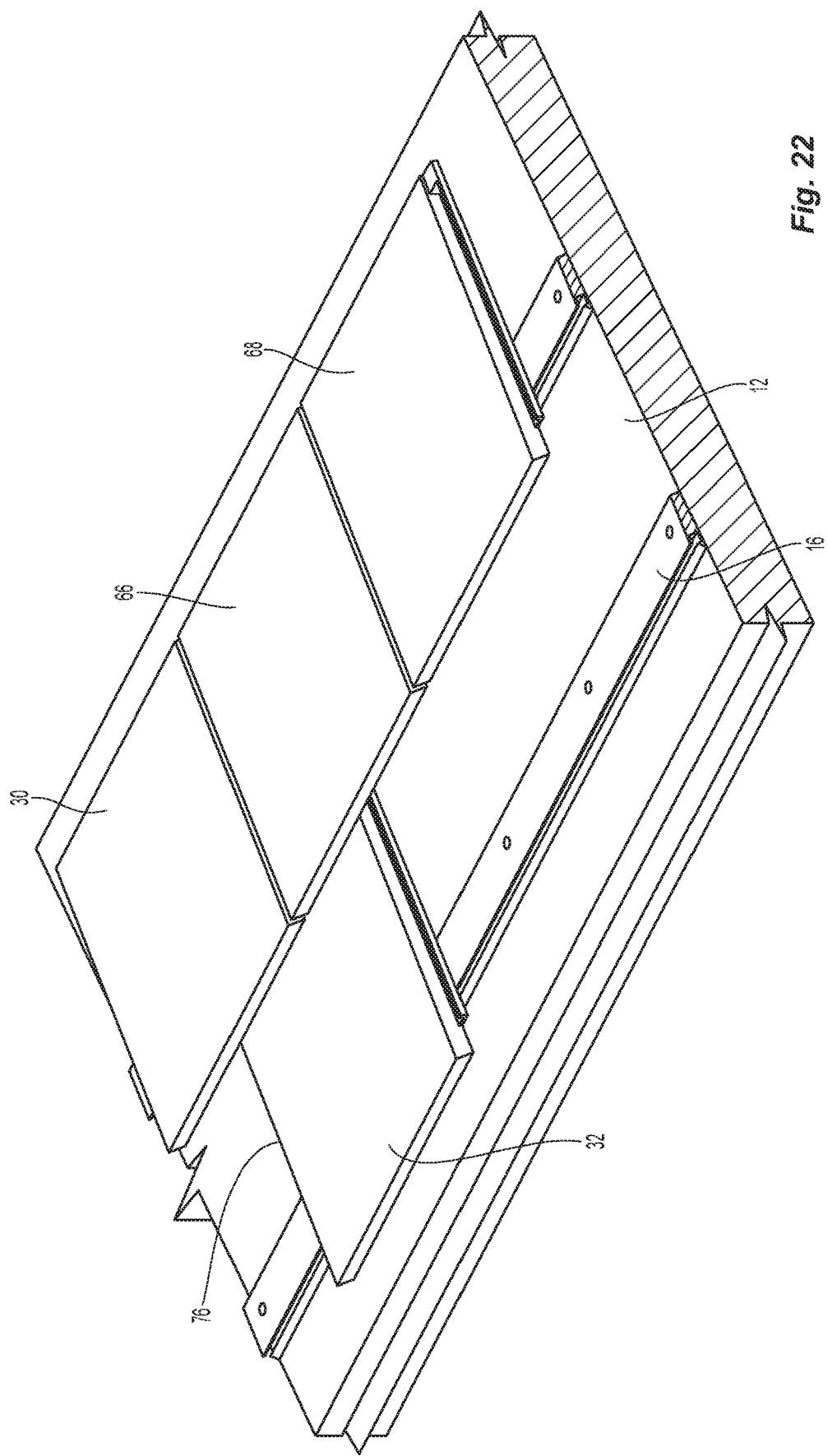
FIG. 22 is similar to FIG. 18 showing a top view of the shingle of FIGS. 19-21 completely installed.

FIG. 22 is sequential to FIG. 18, where lower shingle 32 is installed on batten 16 in a second row below and laterally between shingle 30 and shingle 66.

Figure 23:
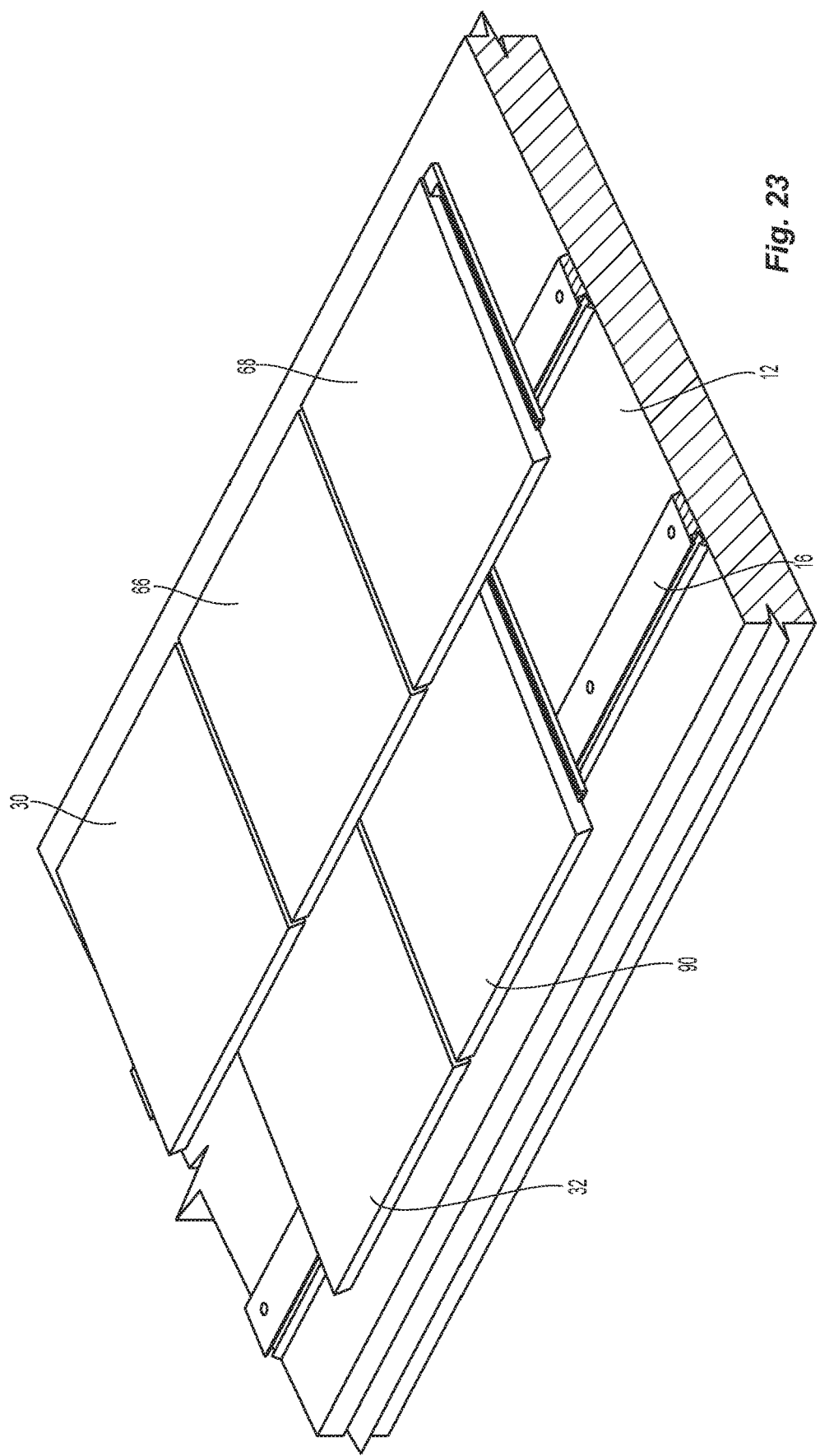
FIG. 23 is similar to FIG. 22 showing installation of an additional shingle.

FIG. 23 is sequential to FIG. 22 where a second lower shingle 90 is installed adjacent to shingle 32 on batten 16. Additional shingles are installed in a lateral direction, side-by-side, until the row is complete. This manner of shingle installation continues until roof 12 is completely covered by shingles.

FIGS. 24-27 are views similar to FIGS. 11-14 showing a second example of a batten and shingle configuration and structure which achieves substantially the same result as the first example.

Specifically, FIGS. 24-27 illustrate shingle 30' being installed on roof deck 12'. In this example, shingle 30' is substantially similar to shingle 30, including similar corresponding portions. Batten 18' includes a mating area generally indicated by reference numeral 42'. Batten 18' may be hollow instead of solid as shown in the first example. Mating area 42' may comprise a batten opening 46' located between batten flange 45' and the top of roof deck 12'. In this example, batten hook 44' is downwardly pointed and is formed at the end of flange 45'. Batten flange 45' and batten hook 44' extend towards the eave of the roof. Mating prong 60' may include a shingle hook 62' and a rear surface 64'. The method of installation of a shingle may be described as follows.

Figure 24:
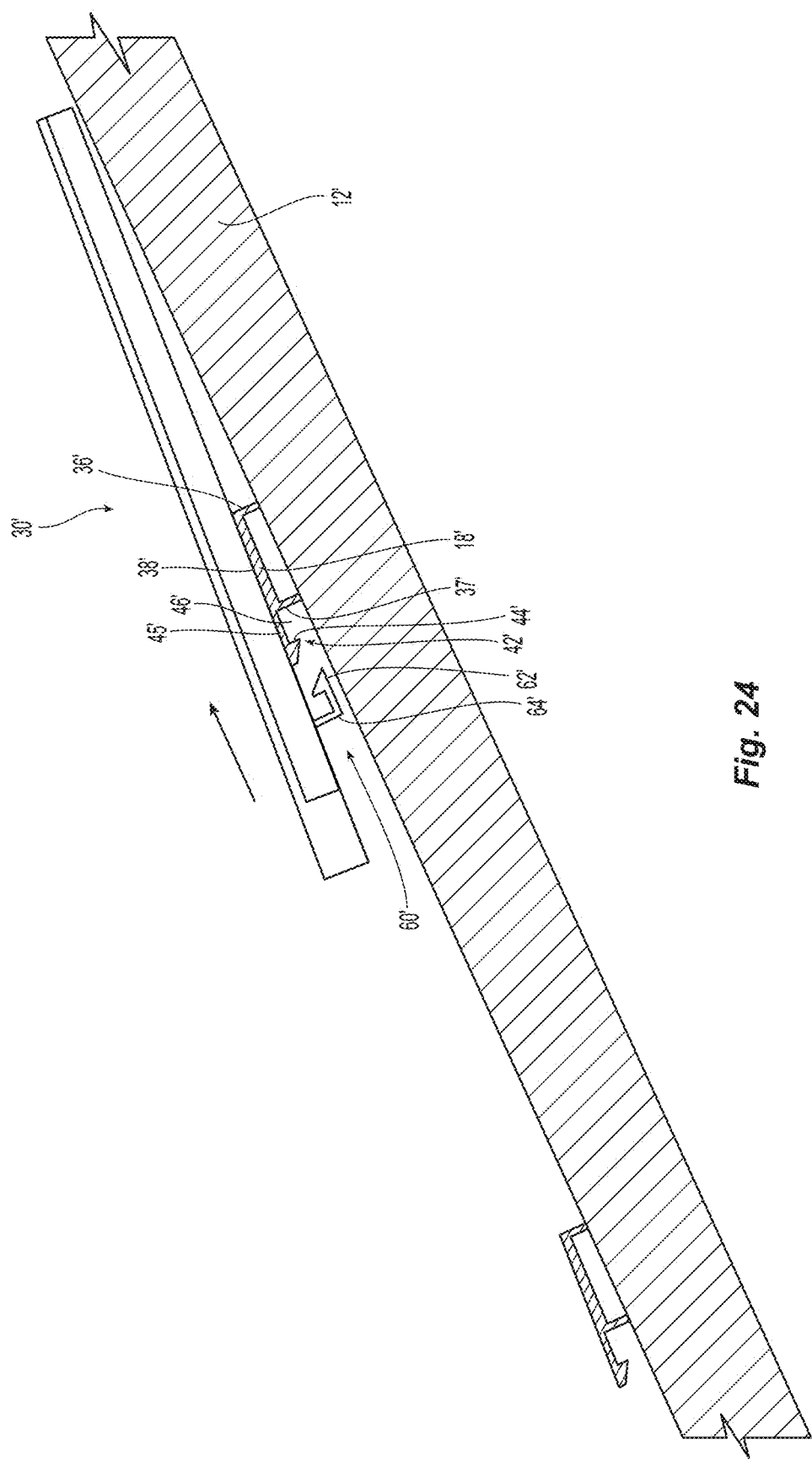
FIGS. 24-27 are similar to FIGS. 11-14 that illustrate a second example.

Referring to FIG. 24 shingle 30' may be installed by moving it upwardly in the direction of the arrow such that mating prong 60', which extends towards the ridge of the roof, is moved into mating area 42' between batten 18' and the top of roof 12'.

Figure 25:
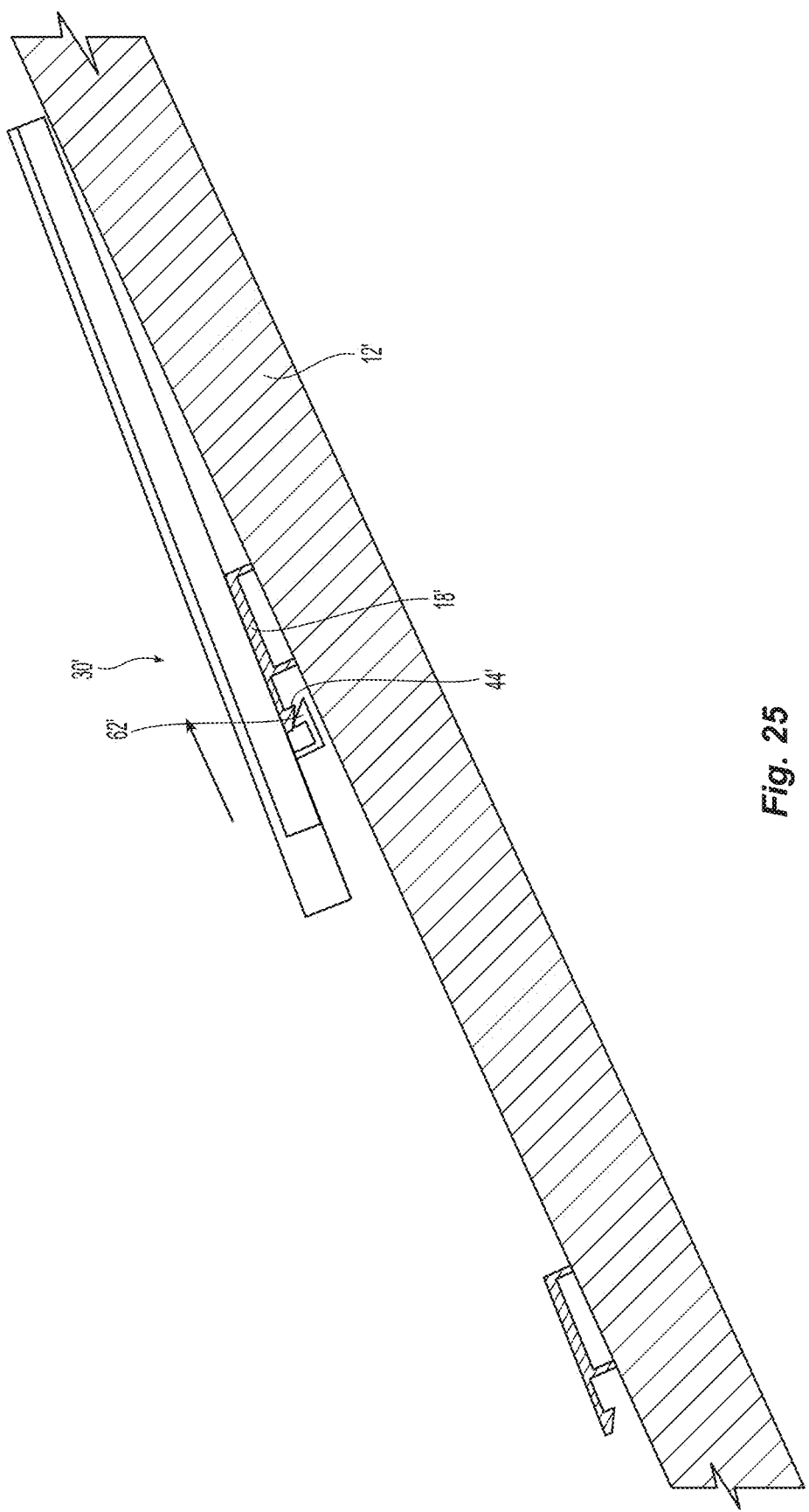

FIG. 25 is sequential to FIG. 24 and shows shingle 30' extending further upwardly until batten hook 44' and shingle hook 62' come into contact.

Figure 26:
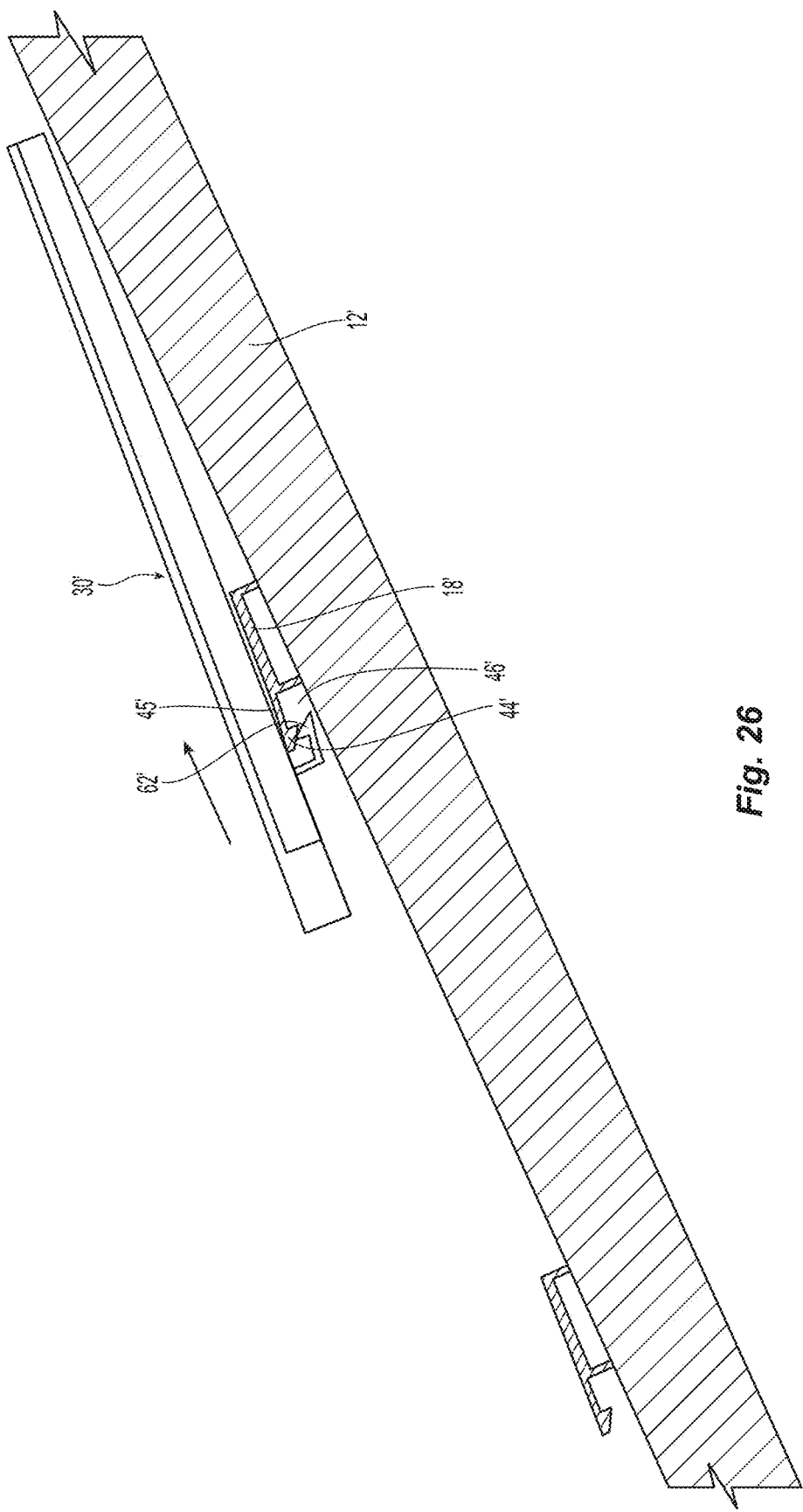

Referring to FIG. 26, once batten hook 44' and shingle hook 62' come into contact, batten flange 45' flexes and rises and shingle hook 62' flexes and lowers.

Figure 27:
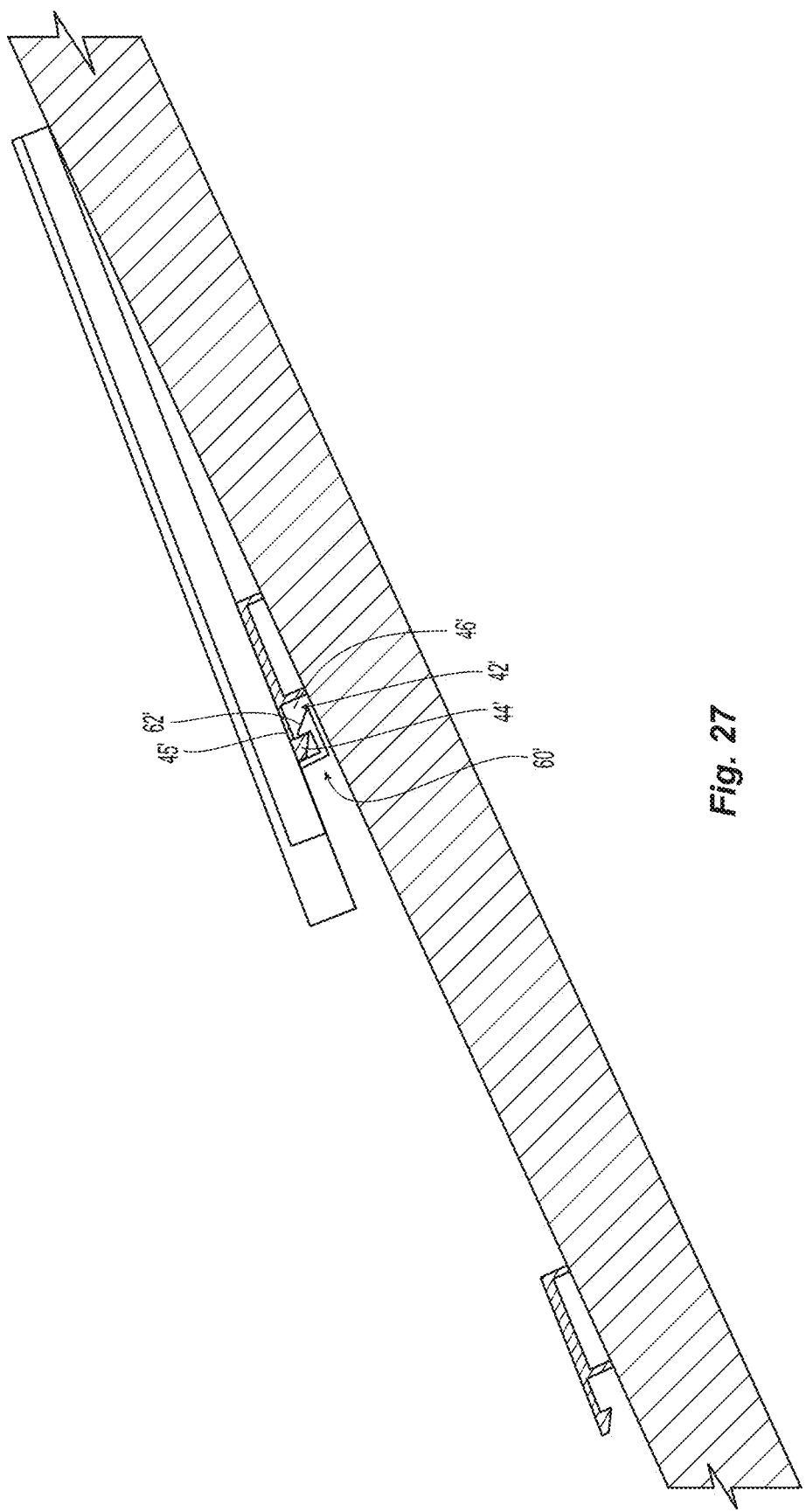

Referring to FIG. 27, which is sequential to FIG. 26, once shingle hook 62' has fully entered batten opening 46', batten flange 45' lowers and shingle hook 62' rises in a snap-fit engagement. The shingle's mating prong 60' is thus coupled to batten hook 44' and is interlocked and secured within batten opening 46' of mating area 42'.

Figure 28:
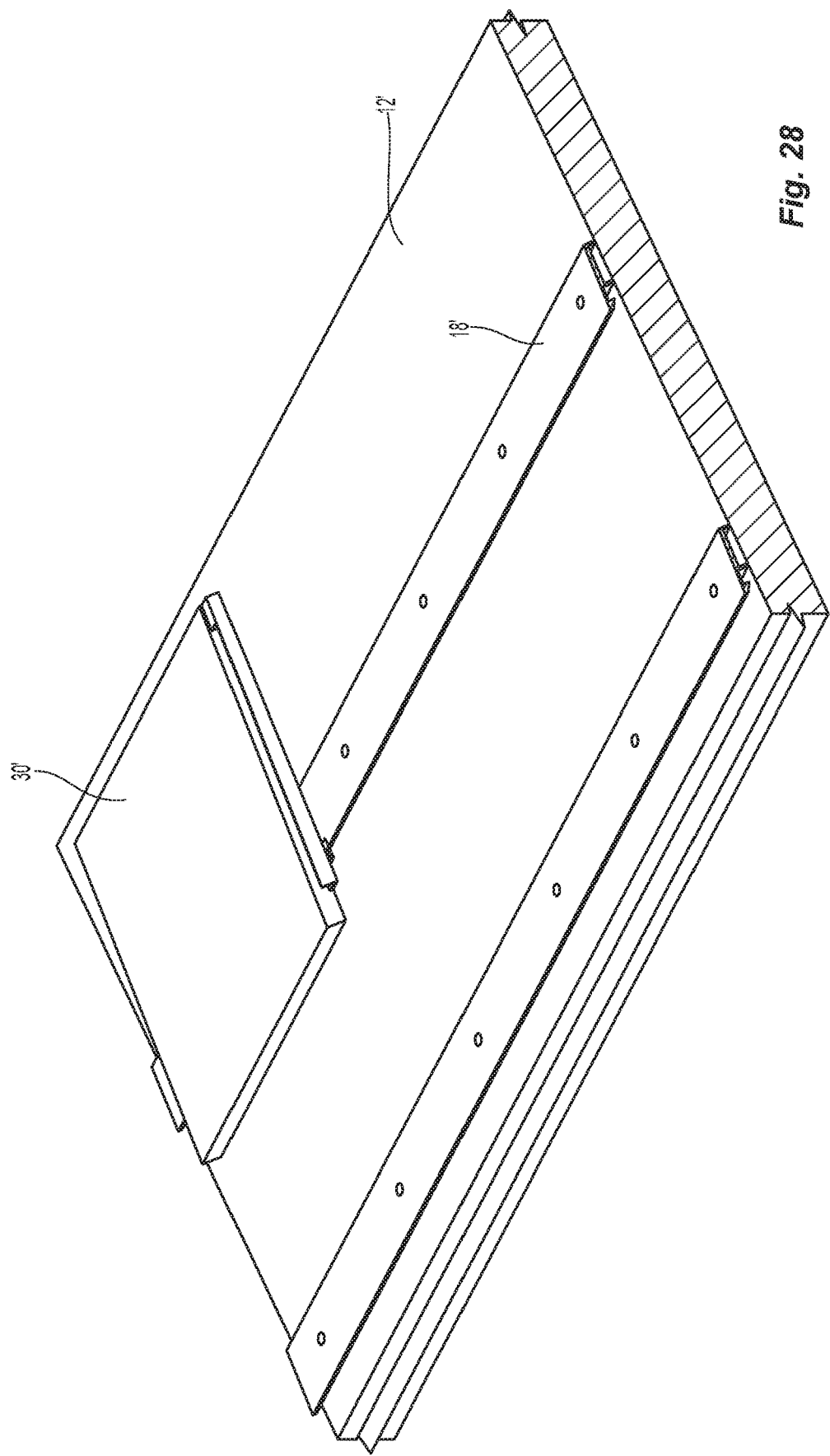
FIG. 28 is similar to FIG. 7, illustrating the second example with an installed shingle.

FIG. 28 illustrates shingle 30' installed on batten 18' on roof deck 12'.

Figure 29:
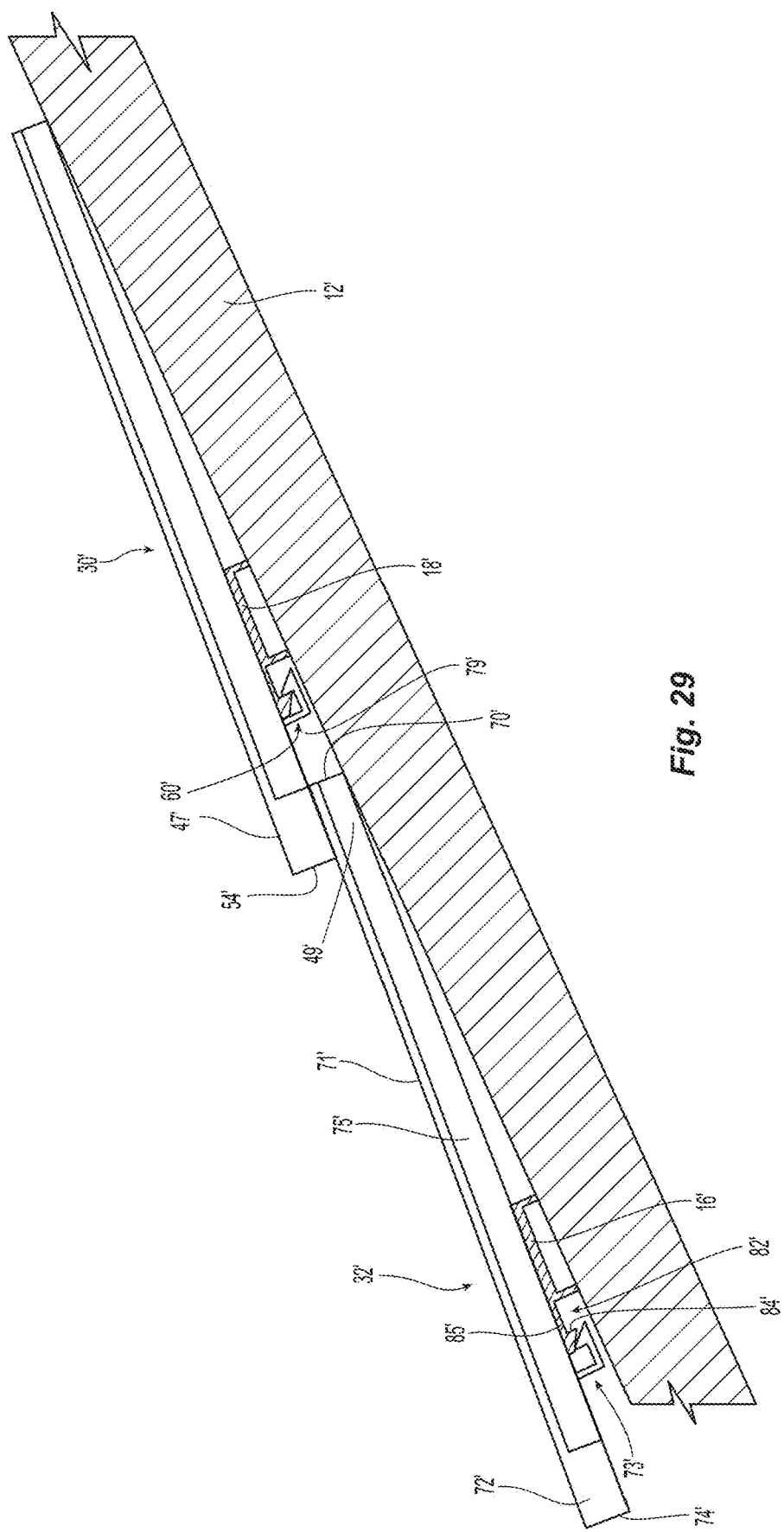
FIGS. 29-31 are similar to FIGS. 19-21 but with the second example.
Figure 30:
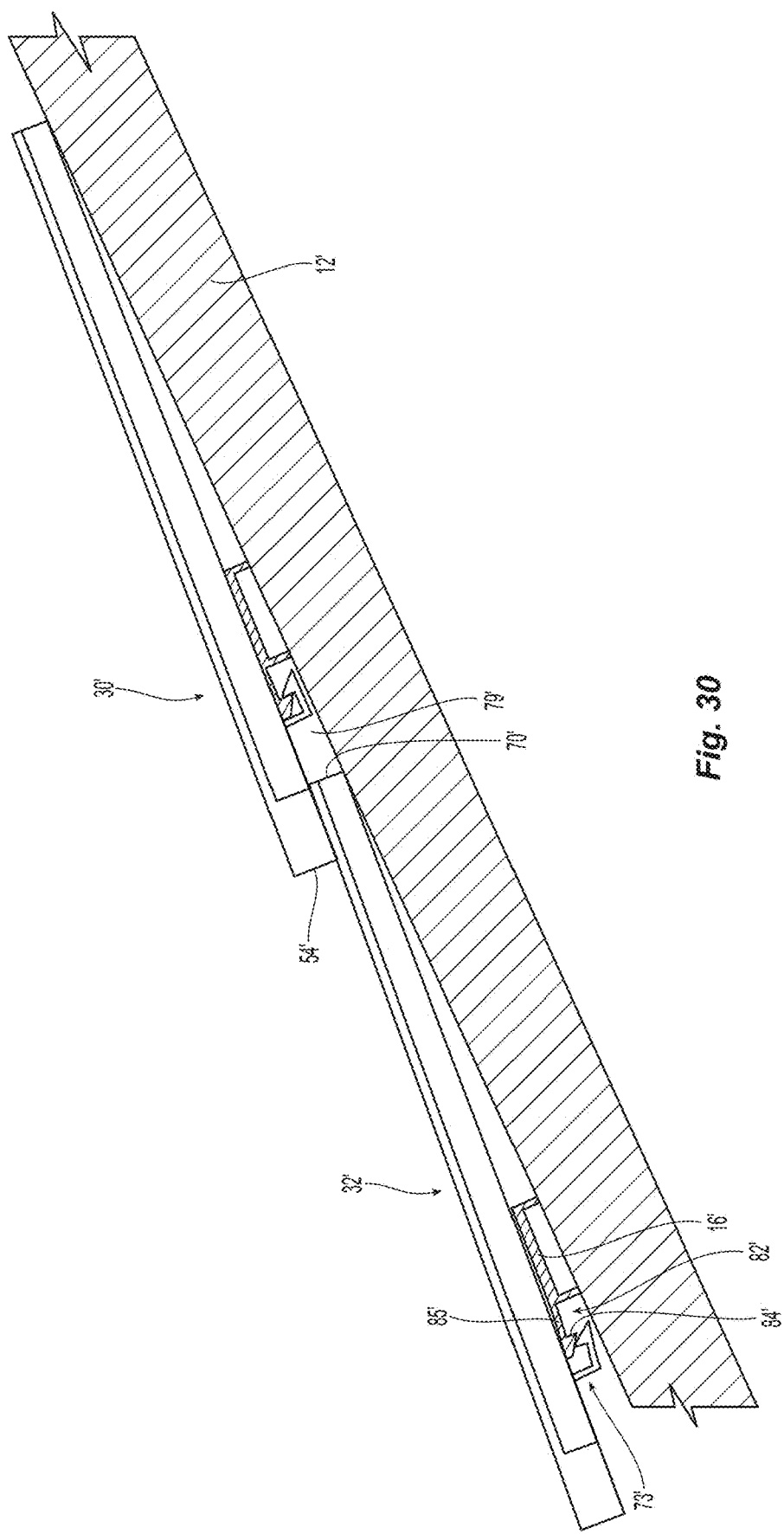
Figure 31:
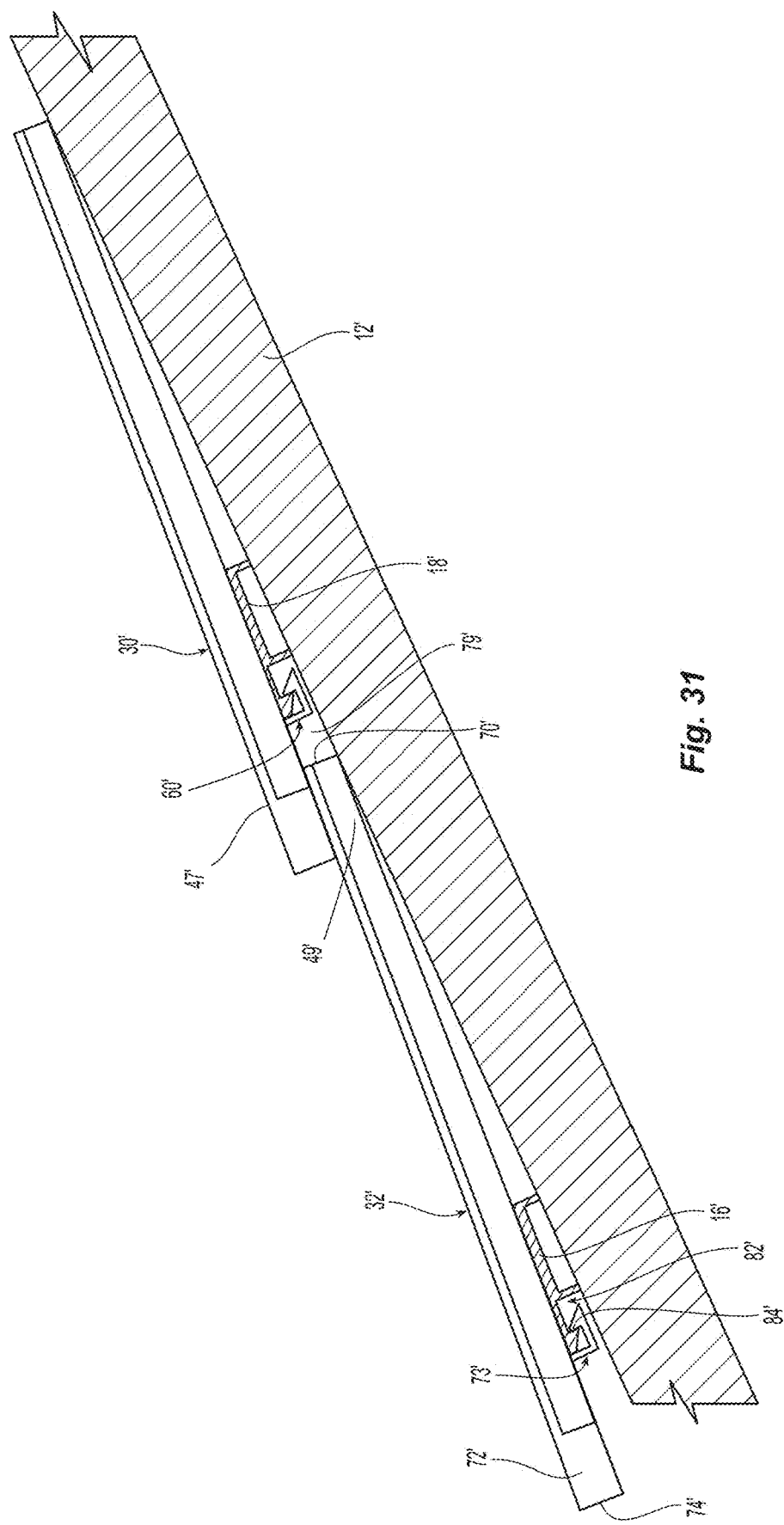

FIGS. 29-31 are similar to FIGS. 19-21 where lower shingle 32' is installed below upper shingle 30' using the same method as shown generally in FIGS. 19-21, but with the second example. For the sake of convenience, lower shingle 32' may be referred to as the first shingle 32', while upper shingle 30' may be referred to as the second shingle 30'.

Referring more particularly to FIG. 29, shingle 32' is being installed on a lower batten 16' than shingle 30'. Shingle 32' has the same corresponding portions as shingle 30', i.e., a mating prong 73', a top surface 71', a front portion 49' having a front edge 70', a rear edge 74', a right side edge 72', and a gutter 75'. Likewise, batten 16' has the same corresponding portions as batten 18', including a mating area 82' having a flange 85' terminating in a batten hook 84'.

FIG. 29 shows the mating prong 73' of lower shingle 32' being inserted into the mating area, generally indicated by reference numeral 82', of batten 16'. Lower shingle 32' is moved in a generally upward direction so that front portion 49' of lower shingle 32' is positioned below rear portion 47' of upper shingle 30'. In other words, top surface 71' of lower shingle 32' will be inserted underneath rear portion 47' of shingle 30' into the opening 79' between upper shingle 30' and roof deck 12'. Opening 79' is formed by front edge 70' of shingle 32' rear portion 47' of shingle 30' mating prong 60', and roof deck 12.

FIG. 30 is similar to FIG. 26-20 in showing lower shingle 32' in the process of mating with batten 16'.

FIG. 31 is similar to FIG. 21 wherein mating prong 73' of lower shingle 32' is coupled with and fully interlocked within mating area 82' of batten 16'. Front portion 49' of first shingle 32' is positioned below rear portion 47' of second shingle 30'. Further, an opening 79' is formed between front edge 70' of front portion 49', rear portion 47' of second shingle 30', shingle prong 60', and roof 12'. Note that batten 16' contacts only first shingle 32' and roof 12', while batten 18' contacts only second shingle 30' and roof 12', and the shingles 32' and 30' are not coupled to each other. As with the first example, shingle 32' is constrained in only one place: at the location of the snap-fit junction where the shingle mating prong 73' is fully interlocked within the batten mating area 82', thereby allowing shingle 32' to "breathe", i.e., expand and contract, after installation.

Figure 32:
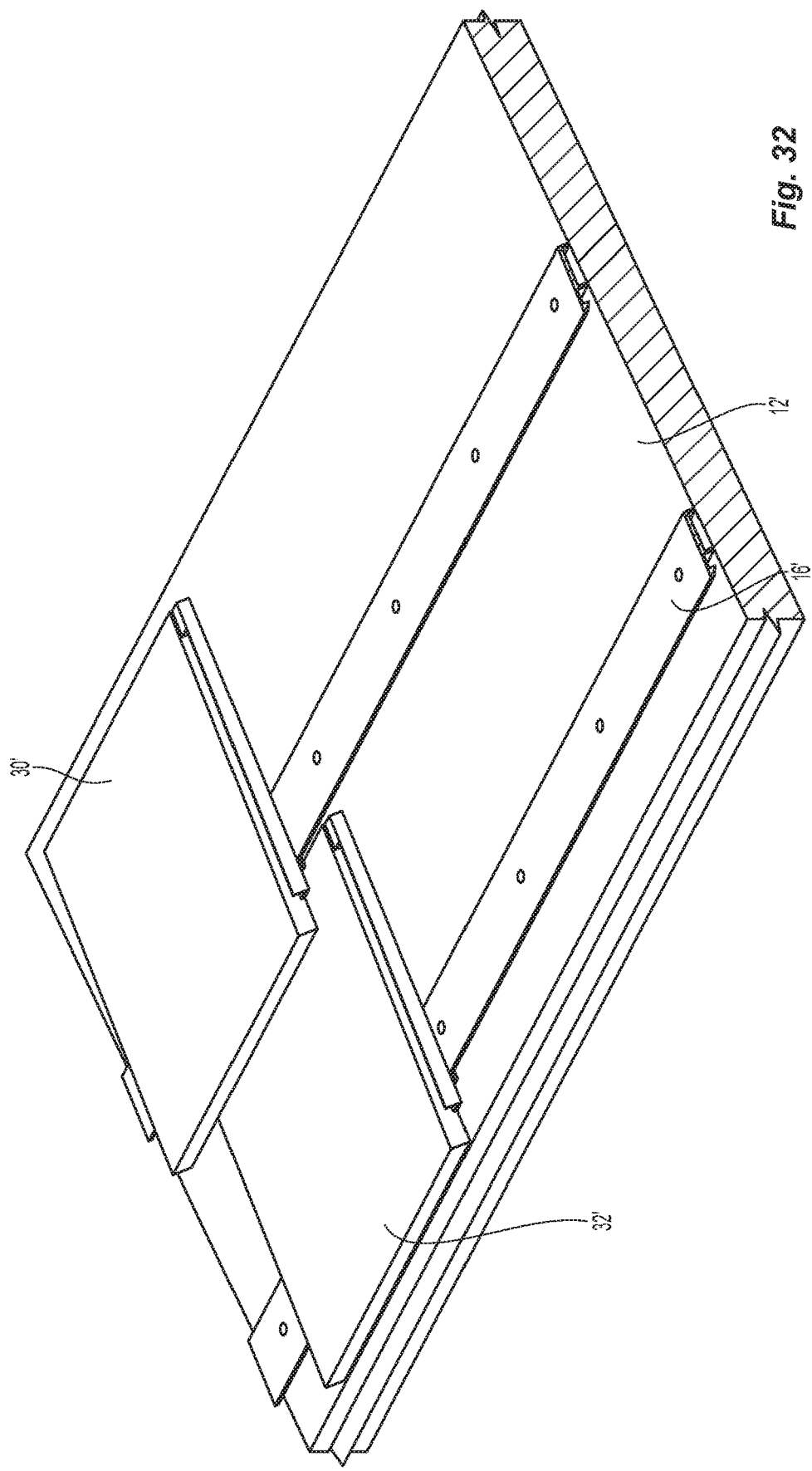
FIG. 32 is similar to FIG. 22, but with the second example, and with several shingles removed for ease of explanation.

FIG. 32 shows lower shingle 32' installed on batten 16' in a second row below shingle 30'. For the sake of simplicity and ease in explanation, shingles which would be installed laterally adjacent to shingle 30' have been omitted from this view. It is understood that, as in the first example, additional shingles are installed in a lateral direction, side-by-side, until a row is complete before moving on to the next row. This manner of shingle installation continues until roof 12' is covered by shingles.

It may be appreciated that by virtue of the foregoing, a straightforward and efficient method and apparatus are provided for installing shingles on a roof. A plurality of rows of battens is first installed from bottom-to-top, each batten having an interlocking portion formed integrally therewith. Then a plurality of shingles is installed from top-to-bottom, one by one, starting at the top row of the roof deck nearest the ridge. Each shingle has an interlocking portion formed integrally therewith which mates with the interlocking portion of a batten in a simple upward movement.

Thus, a snap-fit engagement shingle-batten system for a roof is provided where shingles may be installed in a top-to-bottom manner that holds a shingle in place by locking it into a shingle mating portion of a batten, eliminating the need for nailing shingles onto the roof. It provides a much safer, easier, and more productive installation experience for roofers, while it simultaneously enhances the alignment quality and resulting aesthetic quality of the finished roof.

What is claimed is:

1. Shingle and batten apparatus for a roof, comprising:
    first and second battens attached to said roof;
    said first and second battens each having an integrally formed interlocking portion comprising first and second batten hooks and first and second batten flanges, respectively, each of said batten flanges being flexible, said first and second batten hooks and batten flanges forming first and second batten mating areas, respectively;
    first and second shingles having first and second front portions, respectively, first and second front edges, respectively, and first and second rear portions, respectively;
    said first and second shingles having first and second flexible shingle prongs, respectively, positioned within said first and second batten mating areas, respectively;
    said first and second shingles coupled only to said first and second battens, respectively;
    wherein said front portions of said first and second shingles contact said roof;
    wherein said first and second shingle prongs are interlocked with said first and second batten hooks, respectively, for securing said first and second shingles to said first and second battens, respectively, and to said roof without nails; and
    wherein said first batten is connected only to said first shingle and said roof, and said second batten is connected only to said second shingle and said roof.

2. The apparatus according to claim 1, wherein said roof includes a ridge and an eave, and said first and second batten hooks and said first and second batten flanges extend towards said roof eave, and said first and second flexible shingle prongs extend towards said roof ridge.

3. The apparatus according to claim 2, wherein said first and second batten hooks are formed at the end of said first and second batten flanges, respectively.

4. The apparatus according to claim 1, wherein each of said shingles has only one shingle prong extending from said bottom portion thereof.

5. Apparatus for securing shingles to a roof having a ridge and an eave, which comprises:
    first and second battens attached to said roof and extending substantially parallel to each other and to said ridge and said eave, each of said battens having an integrally formed, flexible flange member that extends towards said roof eave;
    first and second shingles each having a top portion, a bottom portion, a front portion, a rear portion, and first and second side portions;
    each of said shingles having a shingle prong integrally formed therewith and extending substantially the full width thereof and downwardly from said bottom portion thereof, said shingle prongs extending towards said roof ridge;
    each of said battens having a mating area where said flexible flange member interlocks with said shingle prong;
    each of said shingles further having a gutter system comprising an up gutter extending from said first side portion thereof and a down gutter that is complementary with said up gutter and extends from said second side portion thereof, said up gutter adapted to fit within said down gutter upon installation of said plurality of shingles to said battens; and
    said shingle prongs adapted to be interlocked with said flexible flanges in a snap-fit manner to secure each of said shingles to said battens.

6. The apparatus according to claim 5, wherein said first batten is connected only to said first shingle and said roof, and said second batten is connected only to said second shingle and said roof.

7. The apparatus according to claim 5, wherein said first shingle is attached only to said first batten, and said second shingle is attached only to said second batten.

8. The apparatus according to claim 5, wherein said first and second shingles are connected only to said first and second batten flanges, respectively, for attaching said first and second shingles to said first and second battens, respectively.

9. The apparatus according to claim 5, further comprising an opening formed by said front edge of said first shingle, said rear portion of said second shingle, said roof, and said second shingle prong.

10. Shingle and batten apparatus for a roof having a ridge and an eave, comprising:
first and second battens fastened to said roof, said first and second battens substantially parallel to each other and to said ridge and said eave, each of said battens further having an integrally formed, flexible flange that extends towards said roof eave;
a first plurality of shingles attached to said first batten, and a second plurality of shingles attached to said second batten, each of said shingles having a top portion, a bottom portion, a front portion, and a rear portion;
each of said shingles having a shingle prong integrally formed therewith and extending substantially the full width thereof and downwardly from said bottom portion thereof, said shingle prongs extending towards said roof ridge;
each of said battens having a mating area where said flexible flanges are attached to said shingle prongs;
said shingle prongs adapted to be interlocked with said flexible flanges in a snap-fit manner to attach said shingles to said battens; and
wherein said first batten is connected only to said first plurality of shingles and said roof, and said second batten is connected only to said second plurality of shingles and said roof.

11. The apparatus as set forth in claim 10, wherein said first and second plurality of shingles are attached only to said first and second battens, respectively.

12. The apparatus according to claim 10, wherein said front portions of said first and second plurality of shingles are not fastened to said roof.

13. The apparatus according to claim 10, further comprising an opening formed by said front edge of each of said first plurality of shingles, said rear portion of said second plurality of shingles, said roof, and said second shingle prongs of said second plurality of shingles.

14. Shingle and batten apparatus for a roof having a ridge and an eave, comprising:
first and second battens attached to said roof, said first and second battens being substantially parallel to each other and to said ridge and said eave, each of said battens further having an integrally formed, flexible flange that extends towards said roof eave;
a first plurality of shingles coupled to said first batten, and a second plurality of shingles coupled to said second batten, each of said shingles having a bottom portion, a front portion, and side portions;
each of said shingles further having a shingle prong integrally formed therewith and extending downwardly from said bottom portion thereof, said shingle prong extending towards said roof ridge;
each of said battens having a mating area;
said shingle prongs adapted to be interlocked with said flexible flanges in said mating area in a snap-fit manner to couple said shingles to said battens; and
wherein said first and second plurality of shingles are not coupled to each other and are coupled only to said first and second battens, respectively, wherein said first batten contacts only said roof and said first plurality of shingles, and said second batten contacts only said roof and said second plurality of shingles;
each of said first and second shingles having only one shingle prong extending from the bottom portion thereof.

15. The apparatus according to claim 14, wherein said mating areas of said first and second battens further include first and second batten hooks, respectively, extending from said first and second batten flanges, respectively.

16. The apparatus according to claim 14, wherein said front portions of said first and second plurality of shingles are not fastened to said roof.

17. Shingle and batten apparatus for a roof having a ridge and an eave, comprising:
first and second battens attached to said roof, said first and second battens being substantially parallel to each other and to said ridge and said eave, each of said battens further having an integrally formed, flexible flange that extends towards said roof eave;
a first plurality of shingles adjacent to each other and extending laterally along said first batten, and a second plurality of shingles adjacent to each other and extending laterally along said second batten, each of said shingles having a bottom portion, a front portion, and side portions;
a gutter system including an open channel formed integrally with said side portions of said first and second plurality of shingles, said open channel adapted to guide water off said roof;
each of said shingles further having a shingle prong integrally formed therewith and extending downwardly from said bottom portion thereof, said shingle prong extending towards said roof ridge;
each of said battens having a mating area where said flexible flanges become coupled to said shingle prongs in a snap-fit manner to secure said shingles to said battens;
said first plurality of shingles coupled to adjacent shingles by said gutter system of said first plurality of shingles; and
said second plurality of shingles coupled to adjacent shingles by said gutter system of said second plurality of shingles.

18. The apparatus according to claim 17, wherein said mating areas of said first and second battens further include first and second batten hooks, respectively, extending from said first and second batten flanges, respectively.

19. Apparatus for securing shingles to a roof having a ridge and an eave, which comprises:
first and second battens attached to said roof and extending substantially parallel to each other and to said ridge and said eave, each of said battens having an integrally formed, flexible flange member extends towards said roof eave;
first and second shingles each having a top portion, a bottom portion, a front portion, a rear portion, and side portions;
each of said shingles having a shingle prong integrally formed therewith and extending substantially the full width thereof and downwardly from said bottom portion thereof, said shingle prongs extending towards said roof ridge;
each of said battens having a mating area where said flexible flange member becomes coupled to said shingle prong;
each of said shingles further having a gutter system integrally formed with said side portions thereof; and said shingle prongs adapted to be coupled to said flexible flanges in a snap-fit manner to secure each of said shingles to said battens.

20. The apparatus according to claim 19, wherein said first batten and said first shingle prong are positioned at said rear portion of said first shingle, and said second batten and said second shingle prong are positioned at said rear portion of said second shingle.

21. The apparatus according to claim 20, wherein said first batten contacts only said first shingle and said roof and said second batten contacts only said second shingle and said roof.

22. The apparatus as set forth in claim 21, wherein said front portions of said first and second shingles contact said roof.

23. The apparatus as set forth in claim 19, wherein said first and second plurality of shingles are attached only to said first and second battens, respectively.

24. A shingle adapted to be used with a roof having a ridge and an eave and with a batten that extends laterally across and attached to the roof, the batten having a flexible flange formed integrally therewith that extends towards the eave of the roof, the shingle comprising:
   a top portion, a bottom portion, a front portion, a rear portion, and two side portions;
   a shingle prong integrally formed therewith and extending downwardly from said bottom portion thereof, said shingle prong extending towards the ridge of the roof;
   said shingle further having a gutter system comprising an up gutter on one of said side portions and a down gutter on the other of said side portions, said up gutter and said down gutter integrally formed with said shingle, said up gutter and said down gutter adapted to be coupled together between adjacent shingles; and
   said shingle prong adapted to be coupled to the flexible flange of the batten in a snap-fit manner to secure said shingle to the batten.

25. A shingle according to claim 24, wherein said shingle has only one shingle prong extending from said bottom portion thereof.

26. A shingle according to claim 24, wherein said shingle is coupled only to the batten.

\* \* \* \* \*